(12) United States Patent
Calendrille, Jr.

(10) Patent No.: US 7,572,199 B1
(45) Date of Patent: Aug. 11, 2009

(54) MECHANISM FOR ADJUSTING SPRING TENSION IN A DERAILLEUR

(76) Inventor: John L. Calendrille, Jr., 7 Canterbury Dr., Coram, NY (US) 11727

( * ) Notice: Subject to any disclaimer, the term of this patent is extended or adjusted under 35 U.S.C. 154(b) by 608 days.

(21) Appl. No.: 11/182,540

(22) Filed: Jul. 15, 2005

(51) Int. Cl.
*F16H 63/00* (2006.01)

(52) U.S. Cl. .......................................... 474/80; 474/82

(58) Field of Classification Search ............. 474/78–82; 267/265; 74/473.13; 81/304, 165, 177.5
See application file for complete search history.

(56) References Cited

U.S. PATENT DOCUMENTS

| | | | | |
|---|---|---|---|---|
| 1,009,090 | A * | 11/1911 | Parker | 81/165 |
| 4,041,788 | A * | 8/1977 | Nininger, Jr. | 474/80 |
| 4,637,809 | A | 1/1987 | Nagano | |
| 4,690,663 | A | 9/1987 | Nagano | |
| 4,692,131 | A | 9/1987 | Nagano | |
| 4,850,940 | A | 7/1989 | Nagano | |
| 4,981,165 | A * | 1/1991 | Miller et al. | 160/191 |
| 5,033,991 | A * | 7/1991 | McLaren | 474/78 |
| 5,498,211 | A * | 3/1996 | Hsu | 474/80 |
| 5,660,083 | A * | 8/1997 | Huang et al. | 74/502.2 |
| 5,673,594 | A * | 10/1997 | Huang et al. | 74/473.13 |
| 5,836,844 | A | 11/1998 | Yoshida | |
| 5,961,409 | A | 10/1999 | Ando | |
| 6,350,212 | B1 | 2/2002 | Campagnolo | |
| 6,394,921 | B1 | 5/2002 | Fukuda | |
| 6,685,586 | B2 | 2/2004 | Dal Pra' | |

* cited by examiner

*Primary Examiner*—Bradley T King
*Assistant Examiner*—Nuri Altun

(57) ABSTRACT

A mechanism for adjusting spring tension at a derailleur head mountable to a bicycle frame having a limiting stop, includes an orienting washer rotatably mounted to the bicycle frame and having a tail engaging the limiting stop. A coil spring has a first end fixed to the derailleur head and a second end rotatably mounted relative to the orienting washer. An adjusting sleeve in the head rotates the second end of the coil spring relative to the orienting washer, to adjust tension of the spring. A retaining arrangement releasably retains the second end of the spring at a desired angular position after the second end of the spring has been rotated. A bolt secures together the orienting washer, the spring, the sleeve and the retaining arrangement to assemble the mechanism and for mounting the assembled mechanism to the bicycle frame and the derailleur head.

12 Claims, 19 Drawing Sheets

MECHANISM FOR ADJUSTING SPRING TENSION IN A DERAILLEUR

BACKGROUND OF THE INVENTION

The present invention relates generally to bicycle derailleurs, and more particularly, is directed to a bicycle derailleur with mechanism for adjusting the spring tension thereof.

A conventional rear derailleur for a bicycle includes a first pivot axis at the derailleur head which is secured to the bicycle frame and a second pivot axis at the derailleur cage. A spring is provided in association with each of the pivot axes in order to balance the derailleur to achieve a correct angular position thereof. In order to vary the angular position of the derailleur, it is necessary to provide an adjustment of the spring tension of at least one of the springs.

Generally, it is better to provide the adjustment at the derailleur head, rather than the derailleur cage. This is because adjustment at the derailleur cage requires a trial and error adjustment, in which the user grabs and holds the derailleur stationary while making the adjustment, and then releases the derailleur to determine the angular movement caused by such adjustment. This may occur several times by trial and error. On the other hand, since the derailleur head is secured to the bicycle frame, the user can make such adjustment while immediately viewing any change in angular orientation of the derailleur. This makes any adjustment of the spring pressure easier at the derailleur head.

Various arrangements have been provided for adjusting the spring pressure at the derailleur head. These arrangements allow the user to make the spring adjustment at an inboard location of the derailleur. However, the inboard location is a tight location and it can be difficult to make the adjustment thereat.

SUMMARY OF THE INVENTION

Accordingly, it is an object of the present invention to provide a novel mechanism for adjusting spring tension at the derailleur head.

It is another object of the present invention to provide a mechanism for adjusting spring tension at the derailleur head by means of a simple tool.

It is still another object of the present invention to provide a mechanism for adjusting spring tension at the derailleur head in which the adjustment is made at the outboard side of the derailleur, rather than the tight inboard location.

In accordance with an aspect of the present invention, a mechanism for adjusting spring tension at a derailleur head, includes a rotatable orienting washer. A coil spring having a first end is adapted to be fixed relative to the derailleur head or orienting washer and has a second, opposite end rotatably mounted relative to the other of the derailleur head and orienting washer. An adjusting device rotates the second end of the coil spring relative to the other of the derailleur head and orienting washer, without contacting the orienting washer, to adjust tension of the coil spring, and a retaining arrangement releasably retains the second end of the coil spring at a desired angular position after the second end of the coil spring has been rotated. A securing and mounting arrangement secures together the orienting washer, the coil spring, the adjusting device and the retaining arrangement to assemble the mechanism and mounts the assembled mechanism to the derailleur head and either a bicycle frame or a derailleur cage.

In one set of embodiments, the first end of the coil spring is adapted to be fixed to the derailleur head, and the second end of the coil spring is adapted to be rotatable relative to the orienting washer. Specifically, the retaining arrangement includes a spring adjust collar rotatably mounted relative to the orienting washer, and the second end of the coil spring is fixed to the spring adjust collar. The adjusting device is non-rotatably connected with the spring adjust collar and the spring adjust collar is rotatable relative to the derailleur head in order to adjust the tension of the coil spring.

In one embodiment of the first set of embodiments, the retaining arrangement includes gear teeth on the spring adjust collar, and a holding device for engaging with the gear teeth to retain the spring adjust collar and the second end of the coil spring at a desired angular position after the spring adjust collar has been rotated. The holding device can include a pin extending through the orienting washer and having a pawl at an end thereof. In another embodiment, the retaining arrangement can include a lever pivotally mounted to the orienting washer and including a pawl at an end thereof, and a spring which biases the lever to move the pawl into releasable locking engagement with the gear teeth. Alternatively, the retaining arrangement can include a plurality of spaced openings in the spring adjust collar or the orienting washer, an aligned opening in the other of the spring adjust collar and the orienting washer, which is adapted to align with each of the plurality of spaced openings, and a pin for engagement within one of the plurality of spaced openings and the aligned opening for releasably retaining the spring adjust collar and the second end of the coil spring at a desired angular position after the spring adjust collar has been rotated. In still another embodiment, the retaining arrangement includes a first set of ratchet teeth on the spring adjust collar, and a second set of ratchet teeth on the orienting washer, such that the coil spring biases the first and second sets of ratchet teeth into mating engagement. In such case, the spring adjust collar includes a tab for moving apart the first and second sets of ratchet teeth against the force of the coil spring. In another embodiment, the adjusting device is non-rotatably connected with the spring adjust collar and the spring adjust collar is rotatable relative to the derailleur head in order to adjust the tension of the coil spring. In such case, the retaining arrangement includes a cam eccentrically mounted on the orienting washer, gear teeth on the spring adjust collar or the cam, and at least one gear tooth on the other of the spring adjust collar and the cam for engaging with the gear teeth to retain the spring adjust collar and the second end of the coil spring at a desired angular position after the spring adjust collar has been rotated.

In a second set of embodiments, the first end of the coil spring is adapted to be fixed to the orienting washer, and the second end of the coil spring is adapted to be rotatable relative to the derailleur head. In such case, a sleeve is connected with the second end of the spring and adapted to extend through the derailleur head for rotating the second end of the coil spring relative to the orienting washer to adjust tension of the coil spring. The retaining arrangement includes gear teeth on an outer surface of the sleeve, and a holding device for engaging with the gear teeth to retain the sleeve and the second end of the coil spring at a desired angular position after the sleeve has been rotated. Preferably, the gear teeth extend in an axial direction circumferentially along an outer surface of the sleeve. The holding device includes at least one gear tooth extending radially inwardly of the derailleur head for engaging with the gear teeth on the sleeve, such that the sleeve is adapted to be biased axially of the derailleur head to disengage the gear teeth from the at least one gear tooth in order to rotate the sleeve and the second end of the coil spring, whereupon release of pressure from the sleeve causes the gear teeth to engage the at least one gear tooth at a different angle. In another embodiment of the second set, the holding device includes a pawl mounted to the derailleur head for engaging the gear teeth. In such case, the holding device includes a lever pivotally mounted to the derailleur head and including a pawl at an end thereof, and a spring which biases the lever to move the pawl into releasable locking engagement with the gear teeth.

In another embodiment of the second set, a sleeve is connected with the second end of the spring and adapted to extend through the derailleur head for rotating the second end of the coil spring relative to the orienting washer to adjust tension of the coil spring, and the retaining arrangement includes a plurality of spaced openings in the sleeve or the derailleur head, an aligned opening in the other of the sleeve and the derailleur head, which is adapted to align with each of the plurality of spaced openings, and a pin for engagement within one of the plurality of spaced openings and the aligned opening for releasably retaining the sleeve and the derailleur head at a desired angular position after the sleeve has been rotated.

In one embodiment, the adjusting device includes an adjusting sleeve adapted to rotatably extend through the derailleur head and connected directly or indirectly with the second end of the spring, and an adjusting tool for engaging the adjusting sleeve to rotate the adjusting sleeve in the derailleur head. Preferably, the sleeve includes a plurality of openings, and the adjusting tool includes a plurality of pins for engaging within the openings to rotate the sleeve.

In another embodiment, the retaining arrangement includes a spring adjust collar rotatably mounted relative to the orienting washer, the first end of the coil spring being adapted to be fixed to the derailleur head, the second end of the coil spring being adapted to be fixed to the spring adjust collar, and further including a tool for rotating the spring adjust collar. The tool can include a rod or a wrench for rotating the spring adjust collar.

In one embodiment, the derailleur head is mountable to a bicycle frame having a limiting stop, the orienting washer is adapted to be rotatably mounted relative to the bicycle frame, the orienting washer has a tail for engaging the limiting stop of the bicycle frame, and the securing and mounting arrangement secures together the orienting washer, the coil spring, the adjusting device and the retaining arrangement for mounting the assembled mechanism to the bicycle frame and the derailleur head. Preferably, the first end of the coil spring is adapted to be fixed to the derailleur head, the second end of the coil spring is adapted to be rotatable relative to the orienting washer, the retaining arrangement includes a spring adjust collar rotatably mounted relative to the orienting washer, the second end of the coil spring is fixed to the spring adjust collar, the adjusting device is non-rotatably connected with the spring adjust collar and the spring adjust collar is rotatable relative to the derailleur head in order to adjust the tension of the coil spring. In one modification thereof, the retaining arrangement includes a rack having gear teeth thereon and forming an extension of the tail for engaging the limiting stop of the bicycle frame, and a spring biased pawl is connected with the orienting washer for releasably engaging with the gear teeth on the rack at different locations therealong.

In another embodiment, the derailleur head is rotatably mountable to a derailleur cage and includes a tail, the orienting washer is fixed to the derailleur cage and includes a limiting stop which is engaged by the tail, and the securing and mounting arrangement secures together the orienting washer, the coil spring, the adjusting device and the retaining arrangement and mounts the assembled mechanism to the bicycle frame and the derailleur cage.

The above and other objects, features and advantages of the invention will become readily apparent from the following detailed description thereof which is to be read in connection with the accompanying drawings.

BRIEF DESCRIPTION OF THE DRAWINGS

FIG. 16 is a perspective view of a modified rack according to the seventh embodiment of the present invention;

DETAILED DESCRIPTION

Figure 1:
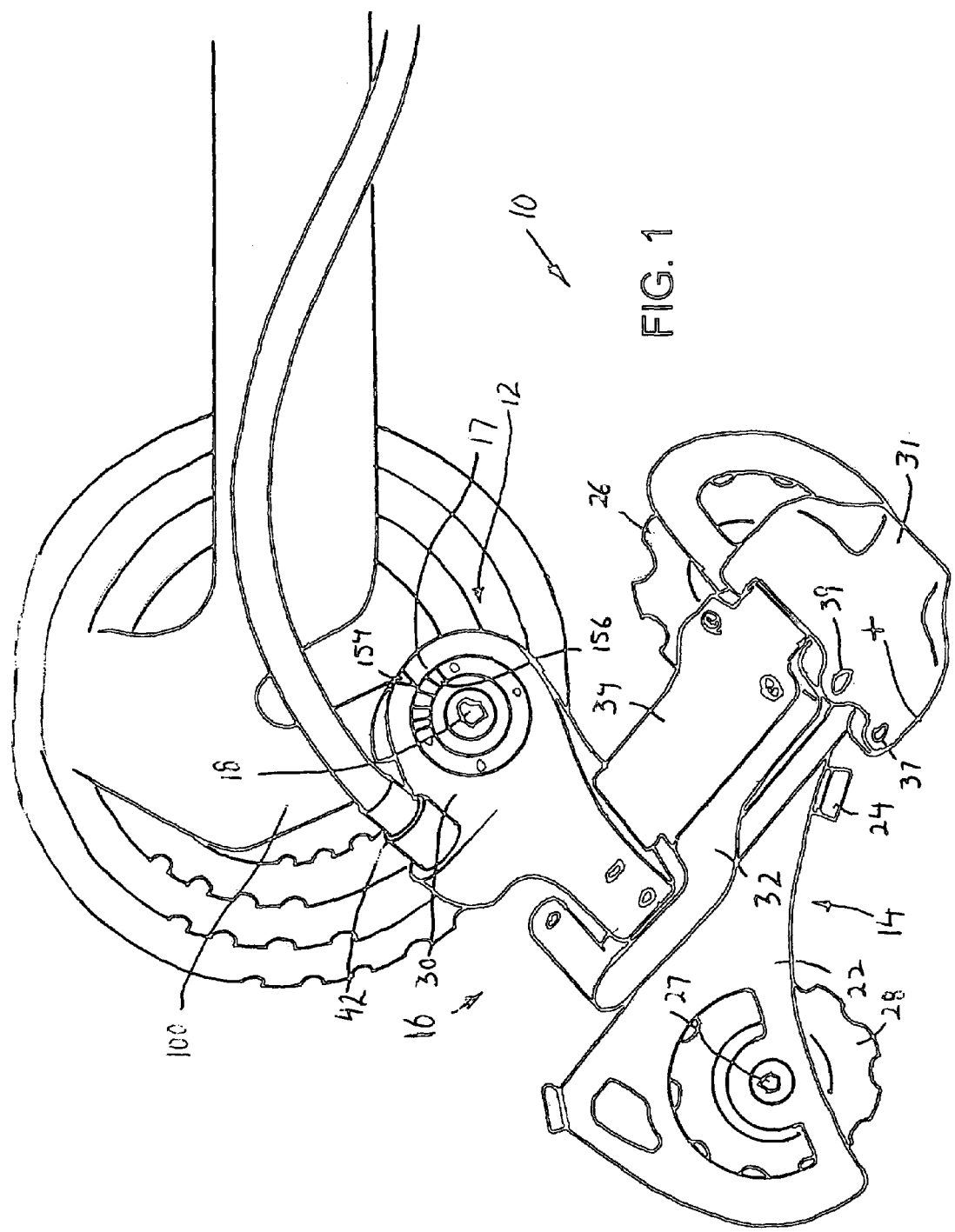
FIG. 1 is an elevational view of a rear derailleur that can be used with the present invention.

Referring to the drawings in detail, an initially to FIG. 1 thereof, there is shown a parallelogram type rear derailleur 10 with which the present invention can be used. However, the present invention is not limited to this type of derailleur. Further, although the present invention will now be discussed in relation to adjusting the spring tension at the derailleur head, the present invention is not limited thereby, and can equally be used to adjust the spring tension at the derailleur cage.

Now, with respect to FIG. 1, rear derailleur 10 includes a clamping assembly 12 which secures rear derailleur 10 to a rear drop-out or rear axle holder 150 of the frame of the bicycle, a chain cage 14 which moves the chain (not shown) from one cog to another, and a controller 16 which connects chain cage 14 to clamping assembly 12 and which, more importantly, actuates chain cage 14 to control the latter to move the chain from one cog to another.

Specifically, clamping assembly 12 includes a clamping head 17 through which a bolt 18 extends for securing rear derailleur 10 to rear drop-out or rear axle holder 150 of the frame.

Chain cage 14 includes inner and outer parallel, spaced apart cage plates 22 and 24. Inner and outer cage plates 22 and 24 are connected together at the proximal end by a pivot shaft (not shown) having a jockey pulley 26 rotatably mounted thereon between cage plates 22 and 24, and are connected together at the distal end by a pivot shaft 27 having an idler pulley 28 rotatably mounted thereon between cage plates 22 and 24.

Controller 16 includes an upper pivot head 30 having clamping head 17 formed as an integral extension thereof. Inner and outer spaced apart pivot bars 32 and 34 are pivotally connected at their upper ends by pivot pins (not shown), respectively, to upper pivot head 30. The lower ends of inner and outer pivot bars 32 and 34 are pivotally connected by pivot pins 37 and 39 to a lower pivot head 31, and a spring (not shown) is provided about pivot pin 37 to normally bias lower pivot head 31 outwardly of the bicycle relative to upper pivot head 30. Lower pivot head 31 is rotatably secured to the proximal end of outer cage plate 24 so as to be capable of rotation relative thereto.

A cable 11 is secured to derailleur 10 and extends upwardly through a guide bore 42 as an extension of upper pivot head 30, to a gear shift lever (not shown) on the bicycle.

When the cable is pulled up, pivot bars 32 and 34 pivot inwardly against the force of the return spring so as to move chain cage 14 inwardly of the bicycle, thereby moving the chain from one cog to another.

The construction and operation of derailleur 10 is provided merely as a preliminary understanding relative to the present invention, but does not form part of the invention herein.

Referring now to FIGS. 2-5, a mechanism 50 for adjusting spring tension at the derailleur head, namely, at upper pivot head 30, according to a first embodiment of the present invention will now be described. As shown, upper pivot head 30 includes a stepped bore 52 therethrough. As shown best in FIG. 3, upper pivot head 30, starting from the outside face, includes a first head portion 30a with a first bore 52a of a first diameter, a contiguous second head portion 30b with a second bore 52b of a second smaller diameter, a contiguous third head portion 30c with a third bore 52c of a diameter between the first and second diameters, and a contiguous fourth head portion 30d with a fourth bore 52d of a fourth diameter similar to the first diameter. A cylindrical bore hole 54 extends axially through second head portion 30b and is in open communication with third head portion 30c. Further, an annular spring retaining flange 56 extends toward the inside face from second head portion 30b and is spaced away from the inner wall of third head portion 30c and defines an annular recess 58 between the inner surface of third head portion 30c and flange 56. In addition, the end face of third head portion 30c is formed with an arcuate cut-away recess 59 of an arcuate range of approximately 60 degrees, the purpose for which will become apparent hereafter.

A coil spring 60 having a first axially extending end 60a and a second opposite axially extending end 60b is inserted into bore 52 from the inside face of upper pivot head 30 until end 60a thereof is positioned in cylindrical bore hole 54 and the respective end of spring 60 is positioned in annular recess 58 in surrounding relation to annular flange 56.

Figure 4:
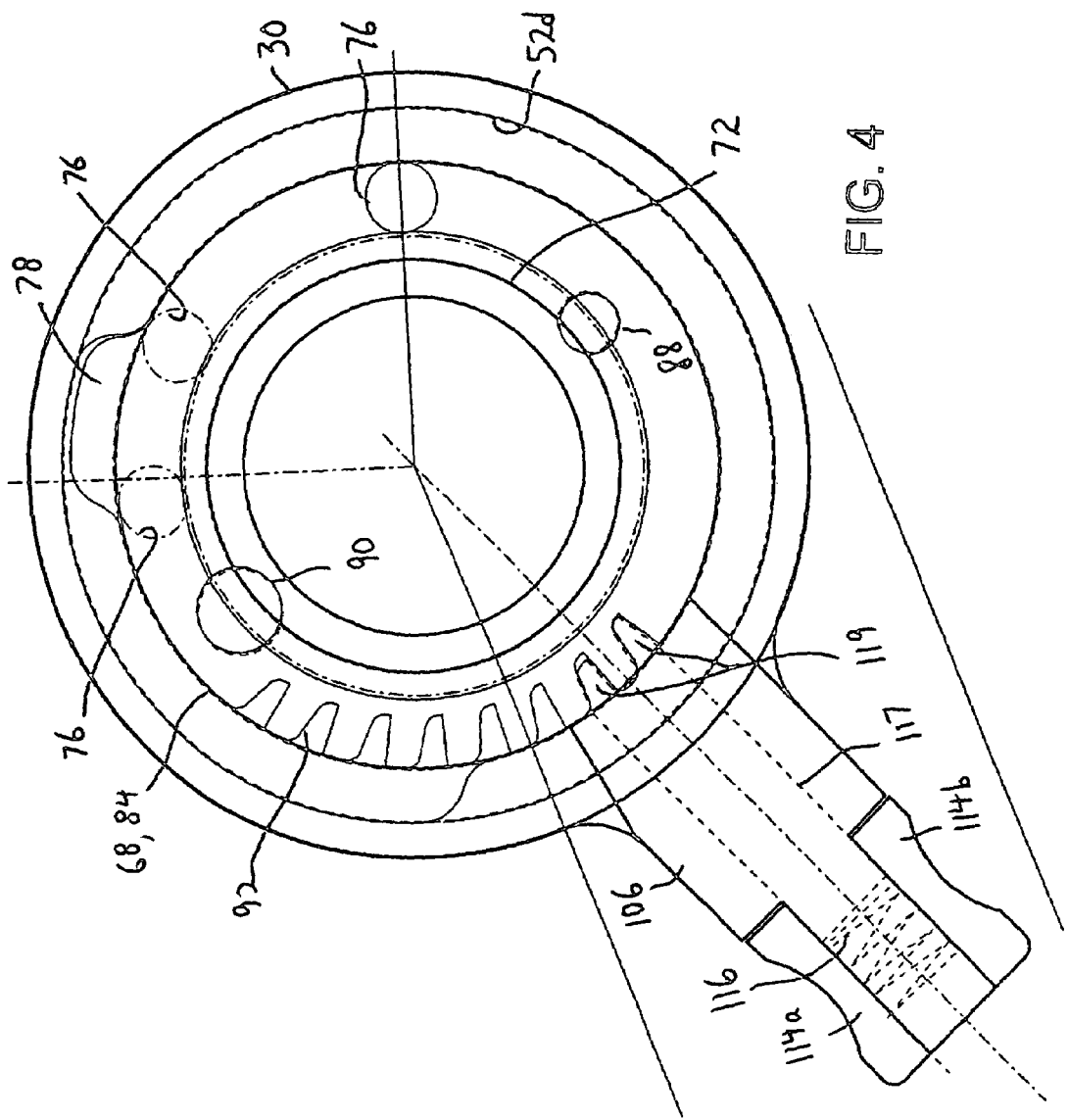
FIG. 4 is an enlarged end view of the mechanism of FIG. 2.
Figure 5:
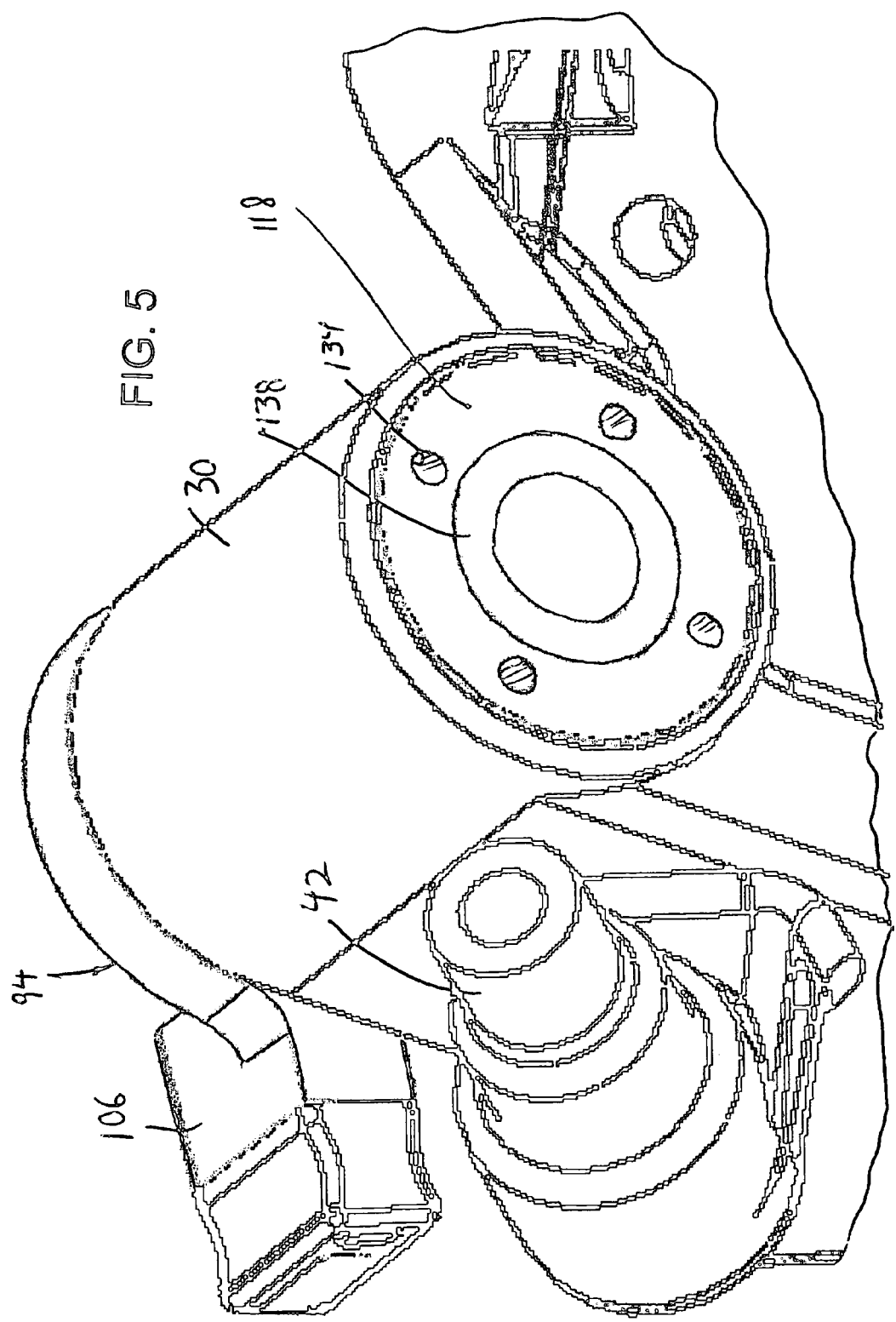
FIG. 5 is a perspective view of the mechanism of FIG. 2, as assembled.

The mechanism 50 further includes a spring adjust collar 62 formed by a first annular collar member 64 and a second annular collar member 66. Specifically, first annular collar member 64 includes a main annular body 68 with a central bore 70. An annular boss 72 extends axially outward from an outer end face of main annular body 68 in surrounding relation to central bore 70, and two diametrically opposite tabs 74 extend axially outward from the outer end face of annular boss 72. A cylindrical opening 76 is formed in the same end face of main annular body 68, but radially outward of annular boss 72 for receiving the opposite end 60b of spring 60, whereas annular boss 72 serves to hold and position the opposite end of spring 60 therearound. Alternatively, as shown in FIG. 4, two openings 76 can be provided at different angular orientations to provide two different pre-sets. A limiting tab 78 extends radially outward from the outer radial surface of main annular body 68 and fits within arcuate cut-away recess 59 to limit the rotation of first annular collar 64 in head 30.

The opposite side of main annular body 68 is formed with two diametrically opposite openings 80 and 82 of different diameters.

Figure 3:
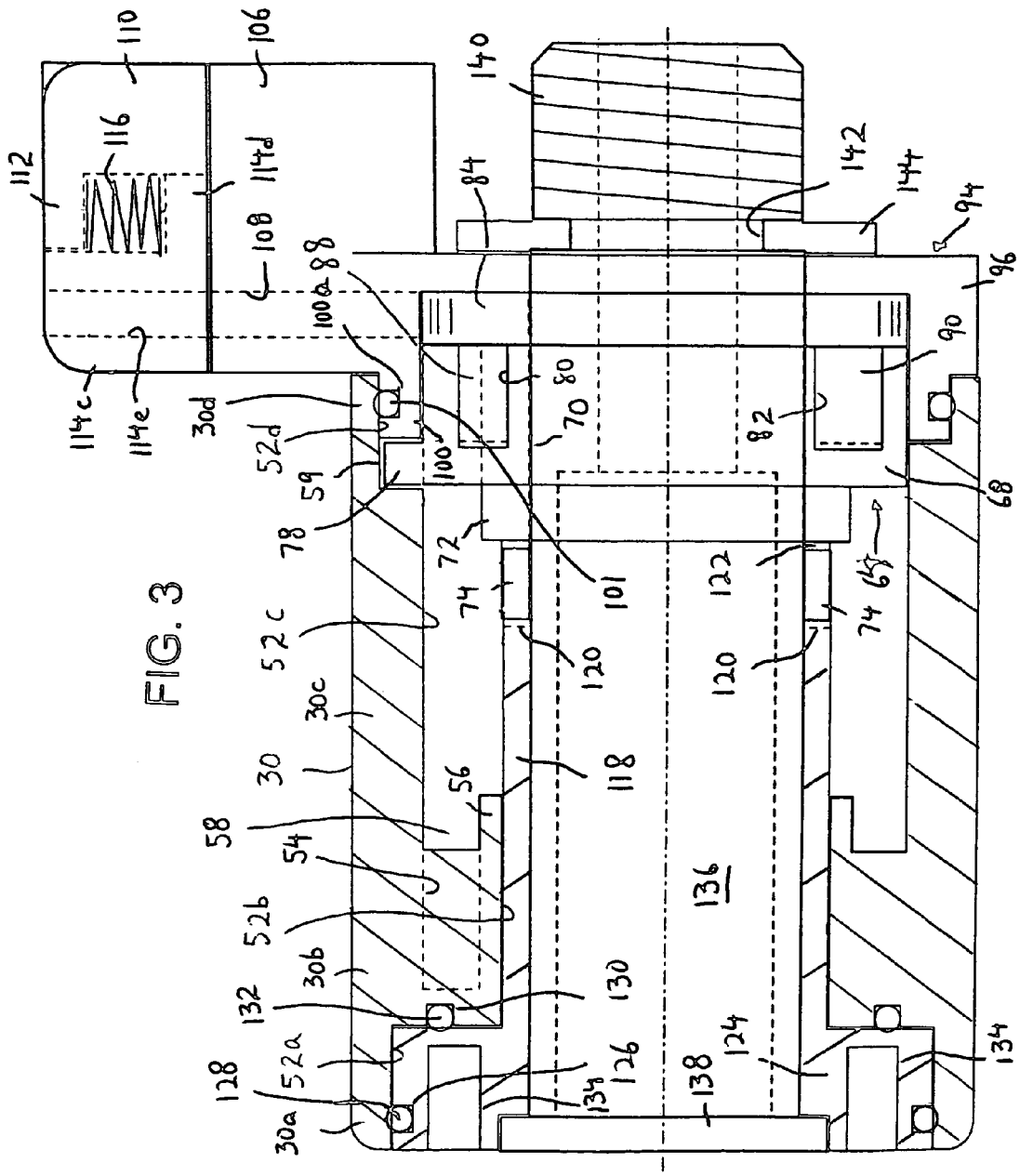
FIG. 3 is a lengthwise view, partly in cross-section, of the mechanism of FIG. 2, as assembled, without the spring.

As best shown in FIG. 3, when first annular collar member 64 is inserted into bore 52, it first enters fourth bore 52d until limiting tab 78 enters arcuate cut-away recess 59 and can travel no further since limiting tab 78 is of a greater diameter than third bore 52c. In this position, spring 60 is retained between the end face of second head portion 30b and first annular collar member 64.

Second annular collar member 66 includes a main annular body 84 having a central bore 86, and two diametrically opposite posts 88 and 90 of different diameters extending axially out from the outer end face thereof for engagement in openings 80 and 82, respectively, to rotatably lock second annular collar member 66 to first annular collar member 64. In addition, a plurality of gear teeth 92 are formed on the radially outer surface of second annular collar member 66 along an arcuate range of between 90 degrees and 180 degrees. It will be appreciated that first annular collar member 64 and second annular collar member 66 can be combined into a single unitary element.

Mechanism 50 further includes an orienting washer 94 having an annular main body 96 with a central bore 98, and an axially extending annular boss 100 in surrounding relation to central bore 98 and extending outwardly from the outer end face of annular main body 96. A shown in FIG. 3, the outer diameter of boss 100 permits boss 100 to be inserted within fourth head portion 30d and in surrounding relation to annular main bodies 68 and 84. Preferably, the outer annular surface of boss 100 includes an annular recess 100a for receiving an O-ring 101 which seals against the inner surface of fourth bore portion 30d, and this is only shown in FIG. 3. However, since the outer diameter of annular main body 96 is greater than the diameter of fourth bore 52d, the outer end face of annular main body 96 abuts against the inner end face of upper pivot head 30.

The opposite side of annular main body 96 is partially closed by an end wall 102 having a central opening 104.

Orienting washer 94 includes a tail 106 extending radially out from an outer radial surface of annular main body 96. A through bore 108 extends entirely radially through tail 106 from an outer end thereof and is in communication with the interior of annular main body 96 of orienting washer 94. An L-shaped hook 110 extends radially out from the end face of tail 106 and includes an axially extending spring retaining leg 112 in spaced relation from the end face of tail 106. A U-shaped block 114 has two legs 114a and 114b connected by a central web 114c. In addition, an end wall 114d (FIG. 3) connects together legs 114a and 114b at a radially inner side thereof. A through bore 114e is provided through central web 114c. U-shaped block 114 is positioned with its legs 114a and 114b in surrounding relation to L-shaped hook 110 and such that end wall 114d is positioned between retaining leg 112 of L-shaped hook 110 and the end wall of tail 106 and such that through bore 114e is in alignment with through bore 108.

A coil spring 116 is positioned between the spring retaining leg 112 and end wall 114d, as best shown in FIG. 3. In this manner, spring 116 normally biases U-shaped block 114 radially inward.

A pin 117 having two pawl teeth 119 at an end thereof is inserted with a tight friction fit through bore 114e of U-shaped block 114 so as to be fixed therein and slidably through bore 108 of tail 106 into engagement with gear teeth 92. Since U-shaped block 114 is held tight against the end face of tail 106 by spring 116, pin 117 maintains the set angular orientation of spring adjust collar 62, and thereby, maintains the set angular orientation of upper pivot head 30, as will be better understood from the discussion which follows.

Mechanism 50 further includes an adjuster sleeve 118 having, at its inner end 118a, two diametrically opposite cut-out recesses 120 that receive tabs 74 of first annular collar member 64 to rotatably lock sleeve 118 to first annular collar member 64. Adjuster sleeve 118 has an outer diameter less than the diameter of second bore 52b so as to slidably fit within bore 52b to an extent that inner end 118a thereof is slightly spaced from the end wall of annular boss 72 by a small gap 122 (FIG. 3). An annular stop ring 124 is fixed to the outer end of sleeve 118 and has an outer diameter that permits it to house within first head portion 30a only. In this manner, the position of sleeve 118 is set within bore 52. In order to provide a seal, the outer annular surface of stop ring 124 is provided with an annular groove 126 (not shown in FIG. 2) which receives an O-ring 128 that seals against the inner annular surface of first head portion 30a. In addition, or alternatively, the outer axially facing end face of second head portion 30b can be provided with an annular groove 130 that contains an O-ring 132 for sealing against the inner facing surface of stop ring 124.

Annular stop ring 124 includes a plurality of axially extending openings 134 on the outer end face thereof, the purpose for which will become apparent from the description which follows.

In order to retain all of the above components together in a unitary assembly, a bolt 136 having an enlarged head 138 is fit within adjuster sleeve 118, spring adjust collar 62 and out through opening 104 in orienting washer 94. The distal end of bolt 136 has screw threads 140 thereon, and an annular groove 142 spaced from the end thereof. A lock washer 144 is snap fit into annular groove 142 in order to lock all of the above components together in a unitary assembly. Then, the free end of bolt 136 is inserted through an opening 146 in rear axle holder 150, and is secured on the opposite side thereof by a nut (not shown). It will be appreciated that rear axle holder 150 includes a ledge 148 against which tail 106 abuts and which acts as a limiting stop for rotation of orienting washer 94.

In operation, with pawl teeth 119 of pin 117 in engagement with teeth 92 of second annular collar member 66, the angular position of second annular collar member 66 is set. Second annular collar member 66 is rotatably fixed with first annular collar member 64 by posts 88 and 90. First annular collar member 64 is rotatably fixed with sleeve 118 through tabs 74 and recesses 120. Further, spring 60 is fixed between upper pivot head 30 and first annular collar member 64. As a result, the tension on spring 60 is set. Because tail 106 abuts against ledge 148, spring 60 serves to rotate upper pivot head 30, and thereby rear derailleur 10 according to the spring tension so as to set the angular orientation of rear derailleur 10.

Figure 2:
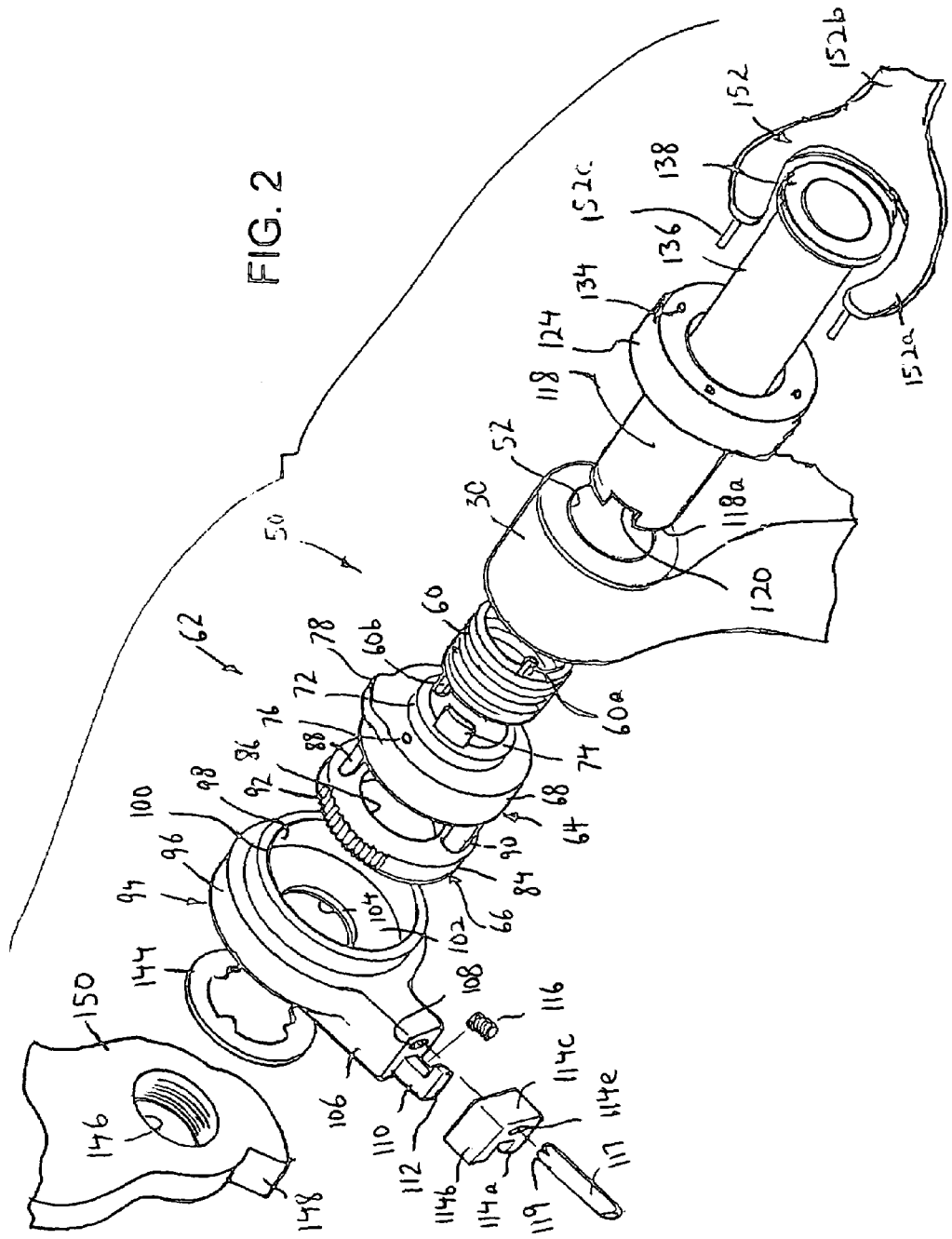
FIG. 2 is an enlarged, blown-apart view of a mechanism according to one embodiment of the present invention for adjusting the angular orientation of the derailleur at the derailleur head.

When it is desired to change this angular orientation, it is necessary to move pawl teeth 119 to different gear teeth 92. In such case, an adjusting tool 152 is provided, and has a U-shaped head 152a and a handle 152b secured thereto. Only a portion of handle 152b is shown in FIG. 2. Two pins 152c extend axially out from the inner surface of U-shaped head 152a at the ends thereof. Specifically, pins 152c are inserted into openings 134 of annular stop ring 124 in order to rotate sleeve 118 through annular stop ring 124. Since sleeve 118 is rotatably fixed with spring adjust collar 62 through tabs 74 and recesses 120, spring adjust collar 62 is also caused to rotate. At this time, pin 117 is pulled out against the force of spring 116 to release pawl teeth 119 from gear teeth 92. This permits free angular adjustment of spring adjust collar 62. When the correct angular orientation of derailleur 10 is achieved, pin 117 is released, so that pawl teeth 119 again lock with gear teeth 92 to lock derailleur 10 in the new angular orientation. Alternatively, pawl teeth 119 can be constructed so that turning of sleeve 118 causes pawl teeth 119 to ride over the rotating gear teeth 92, that is, the force of rotation of sleeve 118 is sufficient to overcome the force of spring 116, until the correct angular orientation is achieved and the external force is removed. In such case, pawl teeth 119 will again lock with gear teeth 92.

In order to provide a guide to enable a person to accurately adjust the angular orientation, as shown in FIG. 1, the outer facing surface of upper pivot head 30 can be provided with a pointer 154 marked thereon, and the outer facing surface of annular stop ring 124 can be provided with indicia markings 156 thereon to provide an indication of the angular orientation.

It will therefore be appreciated that, with the first embodiment, adjustment of the spring tension of spring 60, and thereby, the angular orientation of the derailleur, can be achieved at an outboard position by adjuster sleeve 118.

Figure 6:
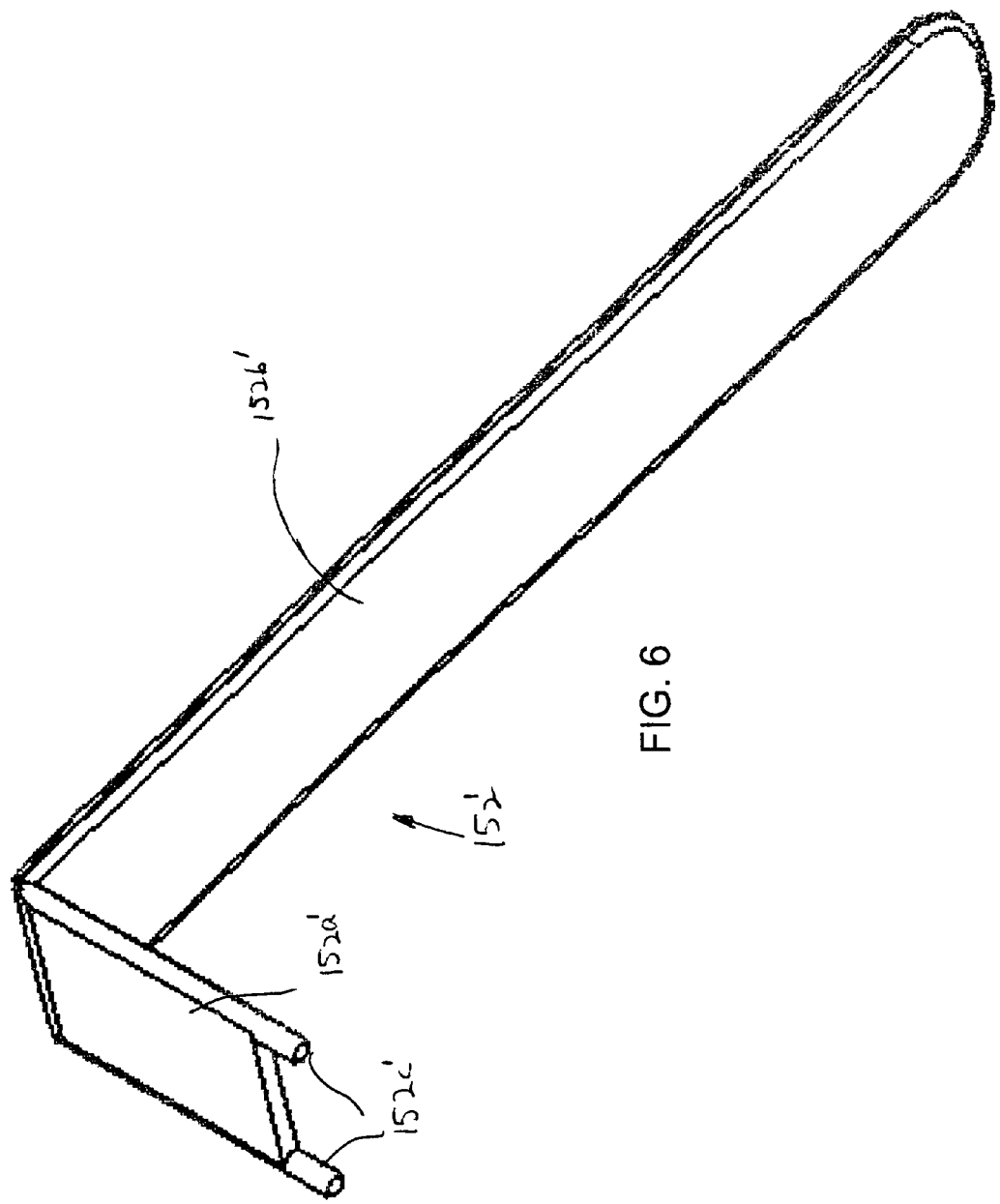
FIG. 6 is a perspective view of an adjusting tool according to another embodiment of the present invention.

FIG. 6 shows a modified adjusting tool 152' having a flat, rectangular U-shaped head 152a' and a handle 152b' secured thereto so that head 152a' and handle 152b' are perpendicular to each other and form an L-shape. Two pins 152c' extend outwardly from the head 152a' at opposite sides thereof, for insertion into diametrically opposite openings 134 of annular stop ring 124 in order to rotate sleeve 118 through annular stop ring 124.

Figure 7:
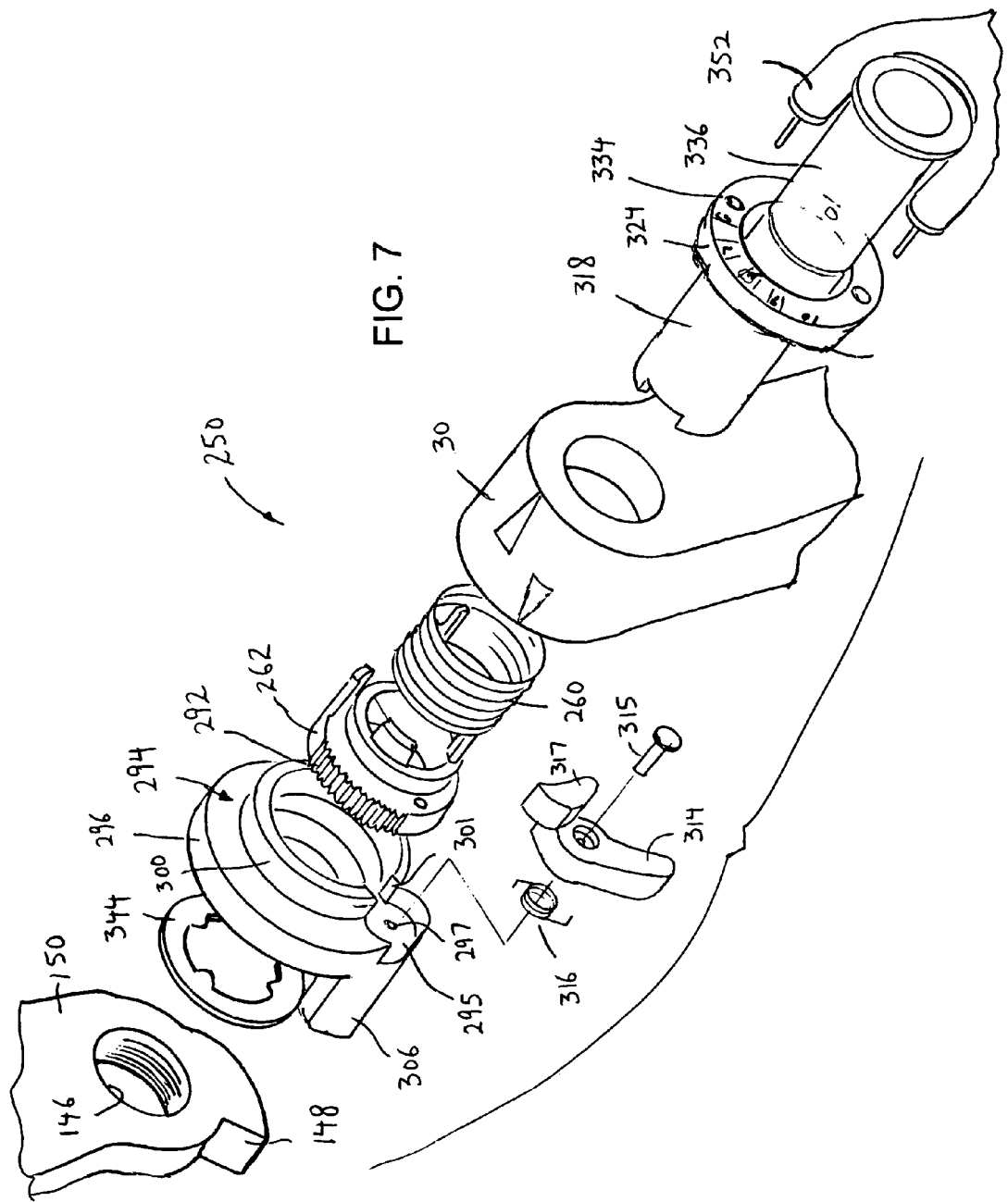
FIG. 7 is an enlarged, blown-apart view of a mechanism according to a second embodiment of the present invention for adjusting the angular orientation of the derailleur at the derailleur head.

Referring now to FIG. 7, a mechanism 250 for adjusting spring tension at the derailleur head, namely, at upper pivot head 30, according to a second embodiment of the present invention, which uses an internal ratchet or pawl, will now be described, in which like elements are described by the same numerals augmented by 200, and a detailed description of the common elements will be omitted for the sake of brevity.

Specifically, mechanism 250 includes upper pivot head 30, spring 260, spring adjust collar 262 with teeth 292, orienting washer 294, adjuster sleeve 318, bolt 336, lock washer 344, rear axle holder 150 with opening 146 and ledge 148, and adjusting tool 352, which are essentially the same as their counterpart elements in the first embodiment of FIGS. 2-5.

One difference is that spring adjust collar 262 is formed as a single unitary member with the combined elements of first annular collar member 64 and second annular collar member 66. Another difference is that tail 306 extends only in the axial direction for better engagement with ledge 148.

The major difference is the manner in which gear teeth 292 of spring adjust collar 262 are engaged to maintain the derailleur in the set angular orientation. Specifically, a recess 295 is provided in the outer facing surface of annular main body 296 of orienting washer 294, and is in communication with an opening 301 in annular boss 300. A hole 297 is provided in recess 295. A pivot lever 314 is pivotally mounted in recess 295 by a pivot pin 315 and extends through opening and includes a pawl 317 at one end that extends through opening 301. Pivot lever 314 is biased by a spring 316 having one end connected with pivot lever 314 and another end connected with orienting washer 294 to normally bias pawl 317 into engagement with teeth 292. The exact dimensions are not shown in proportion in FIG. 7 in order to better illustrate the invention.

To provide adjustment, the free end of pivot lever 314 is pushed down in FIG. 7, which functions to pivot the pivot lever 314 around pivot pin 315 against the force of spring 316 in order to disengage pawl 317 from teeth 292. Then, adjusting tool 352 engages with the openings 334 in annular stop ring 324 in the same manner described above with respect to mechanism 50 of FIGS. 2-5 in order to rotate the derailleur and thereby adjust the spring tension of spring 260. Pivot lever 314 is then released, whereupon spring 316 again biases pawl 317 into engagement with teeth 292 to set the angular position of the derailleur.

Figure 8:
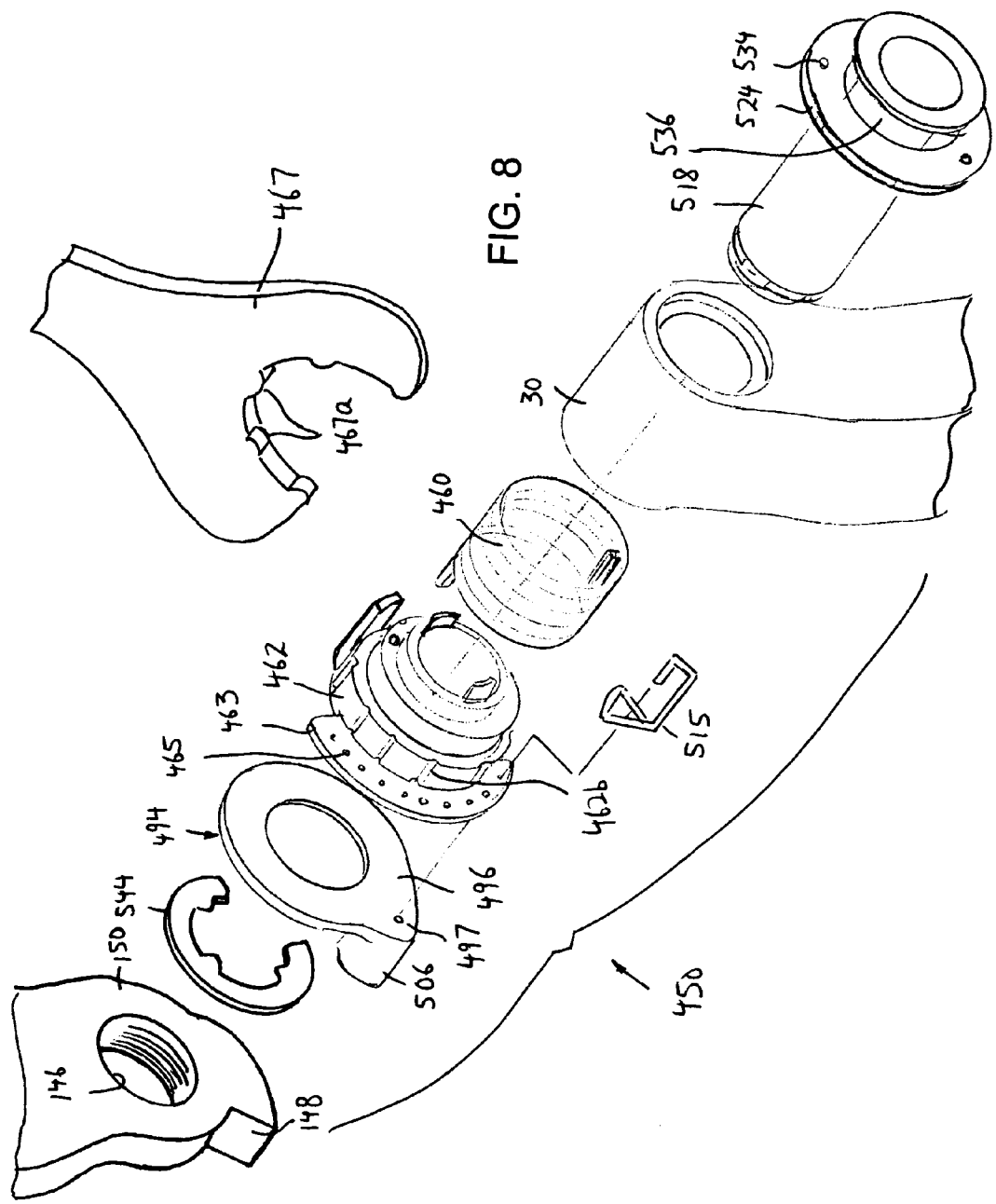
FIG. 8 is an enlarged, blown-apart view of a mechanism according to a third embodiment of the present invention for adjusting the angular orientation of the derailleur at the derailleur head.

Referring now to FIG. 8, a mechanism 450 for adjusting spring tension at the derailleur head, namely, at upper pivot head 30, according to a third embodiment of the present invention will now be described, in which elements similar to those in the second embodiment of FIG. 7 are described by the same numerals but augmented by 200, and a detailed description of the common elements will be omitted for the sake of brevity.

Specifically, mechanism 450 includes upper pivot head 30, spring 460, adjuster sleeve 518, bolt 536, lock washer 544, rear axle holder 150 with opening 146 and ledge 148, and same adjusting tool (not shown) as adjusting tools 152, 352, which are essentially the same as their counterpart elements in the first embodiment of FIGS. 2-5.

The major difference is the manner in which spring adjust collar 462 is engaged to maintain the derailleur in the set angular orientation. Rather than using gear teeth on spring adjust collar 462, spring adjust collar 462 includes an arcuate flange 463 extending radially out from an upper surface at the inner edge thereof, over an arc in a range between 90 degrees and 180 degrees. Arcuate flange 463 includes a plurality of holes 465 which are equidistantly spaced therealong.

Orienting washer 494 is formed as an annular ring 496 with a tail 506 extending axially rearwardly therefrom. A hole 497 is formed in annular ring 496 at the position of tail 506. When assembled, arcuate flange 463 is flush against annular ring 496, and one of the holes 465 is in alignment with hole 497. A pin 515 can be engaged through one of the holes 465 and through hole 497 to rotatably lock spring adjust collar 462 with orienting washer 495.

Of course, it will be appreciated that the plurality of openings 465 can be provided in orienting washer 494 and the single opening 497 can be provided in arcuate flange 463.

To provide adjustment, pin 515 is removed from holes 465 and 497 to permit rotation between spring adjust collar 462 and orienting washer 495. Then, the same adjusting tool (not shown) as adjusting tools 152, 352, engages with the openings 534 in annular stop ring 524 in the same manner described above with respect to mechanism 50 of FIGS. 2-5 in order to rotate the derailleur and thereby adjust the spring tension of spring 460. Pin 515 is then reinserted through another one of the holes 465 and through hole 497 to rotatably lock spring adjust collar 462 with orienting washer 495, thereby setting a different angular position of the derailleur.

Figure 9:
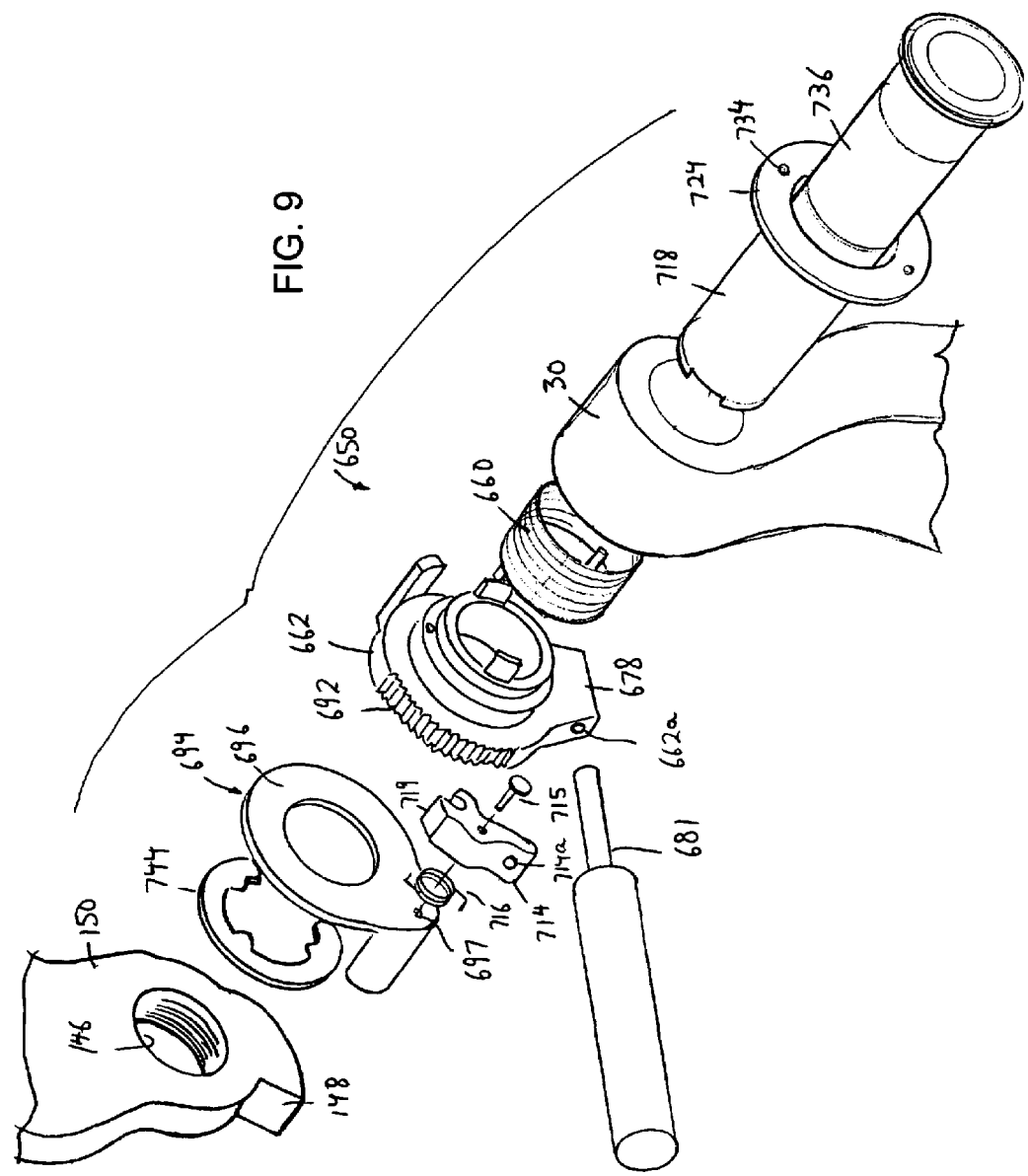
FIG. 9 is an enlarged, blown-apart view of a mechanism according to a fourth embodiment of the present invention for adjusting the angular orientation of the derailleur at the derailleur head.

Referring now to FIG. 9, a mechanism 650 for adjusting spring tension at the derailleur head, namely, at upper pivot head 30, according to a fourth embodiment of the present invention, which uses an external ratchet or pawl, will now be described, in which elements similar to those in the third embodiment of FIG. 8 and are described by the same numerals but augmented by 200, and a detailed description of the common elements will be omitted for the sake of brevity.

Specifically, mechanism 650 is effectively a combination of mechanisms 250 and 450. Mechanism 650 includes upper pivot head 30, spring 660, spring adjust collar 662, orienting washer 694, adjuster sleeve 718, bolt 736, lock washer 744, rear axle holder 150 with opening 146 and ledge 148, and the same adjusting tool (not shown) as adjusting tools 152, 352, which are essentially the same as their counterpart elements in the second and third embodiments of FIGS. 7 and 8.

However, there are differences. Pivot lever 714 is pivotally mounted flush to the outer facing surface of annular ring 696 of orienting washer 694 by pivot pin 715 engaged in hole 697, and includes two pawl teeth 719 at the end thereof for engagement with gear teeth 692 on spring adjust collar 662. Pivot lever 714 is biased into engagement with gear teeth 692 by a spring 716. Further, spring adjust collar 662 includes a flange extension 678 extending downwardly therefrom, the purpose for which will become apparent from the discussion hereafter.

To provide adjustment, pivot lever 714 is pivoted by the person's finger around pivot pin 715 against the force of spring 716 in order to disengage pawl teeth 719 from teeth 692. Then, the same adjusting tool (not shown) as adjusting tools 152, 352 engages with the openings 734 in annular stop ring 724 in the same manner described above with respect to mechanism 50 of FIGS. 2-5 in order to rotate the derailleur and thereby adjust the spring tension of spring 660. Pivot lever 714 is then released, whereupon spring 716 again biases pawl teeth 719 into engagement with teeth 692 to set the angular position of the derailleur.

Figure 10:
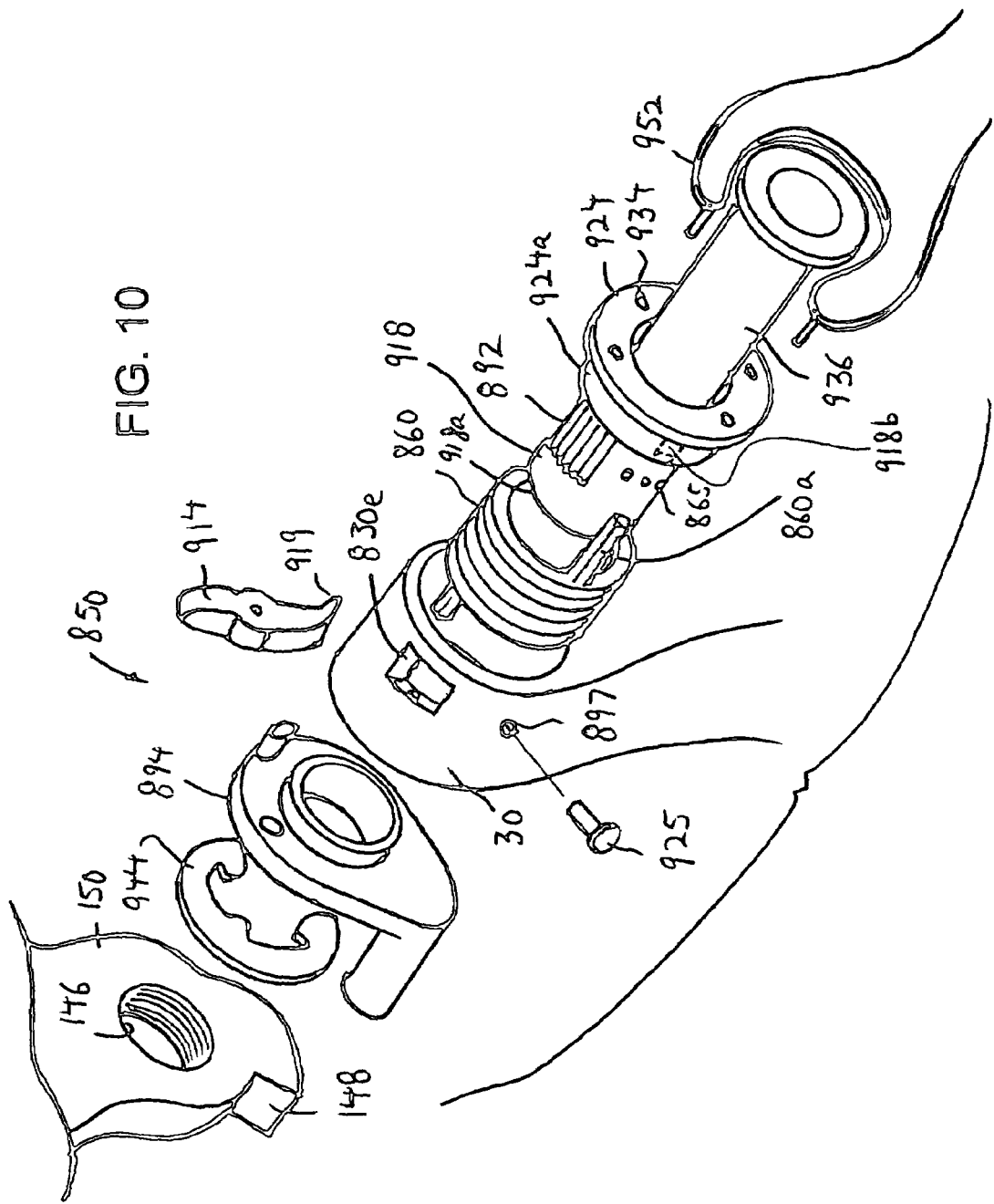
FIG. 10 is an enlarged, blown-apart view of a mechanism according to a fifth embodiment of the present invention for adjusting the angular orientation of the derailleur at the derailleur head.
Figure 11:
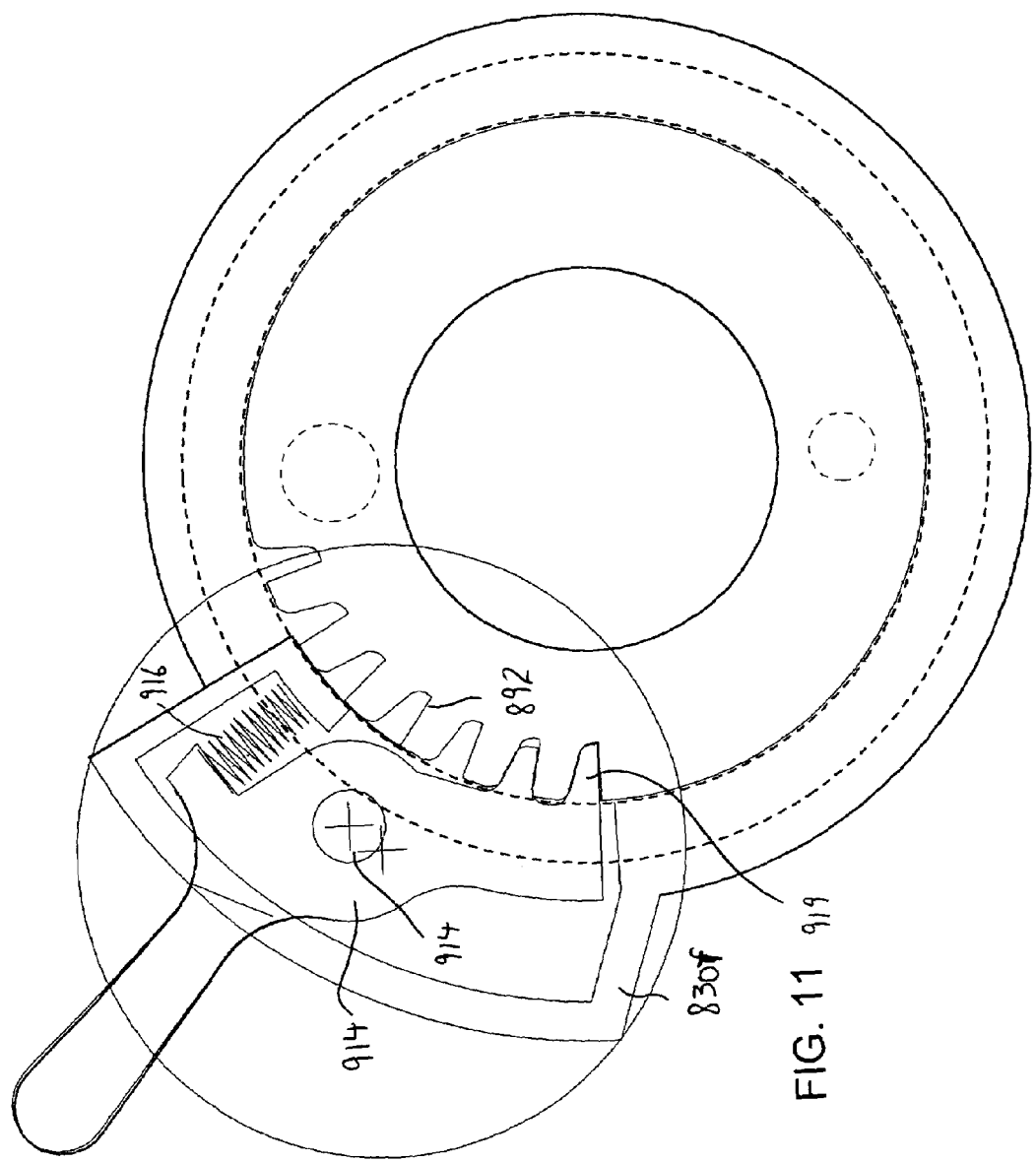
FIG. 11 is an enlarged end view of the mechanism of FIG. 10.

Referring now to FIGS. 10 and 11, a mechanism 850 for adjusting spring tension at the derailleur head, namely, at upper pivot head 30, according to a fifth embodiment of the present invention, which uses a ratchet and/or pinned arrangement on an outboard side, will now be described, in which elements similar to those in the second embodiment of FIGS. 2-5 are described by the same numerals but augmented by 600, and a detailed description of the common elements will be omitted for the sake of brevity.

Specifically, mechanism 850 includes upper pivot head 30, spring 860, adjuster sleeve 918, bolt 936, lock washer 944, rear axle holder 150 with opening 146 and ledge 148, and adjusting tool 952, which are essentially the same as their counterpart elements in the first embodiment of FIGS. 2-5.

The major difference is the manner in which the derailleur is set in the desired angular orientation. In the first place, the spring adjust collar is eliminated.

Thus, end 860a of spring 860 is connected with adjuster sleeve 918. In this regard, end 860a is elongated and fits in an opening 918b of an inwardly extending annular extension 924a of annular stop ring 924. Rather than using gear teeth on the spring adjust collar, the gear teeth 892 extend circumferentially, in the axial direction, along adjuster sleeve 918, just inwardly of annular extension 924a. An opening 830e is provided in the upper surface of upper pivot head 30, toward the outer facing edge thereof, and a pivot lever 914 is pivotally mounted in opening 830e by a pivot pin 915. Pivot lever 914 has a pawl 919 at one end for engagement with gear teeth 892, and a spring 916 normally biases pivot lever 914 so that pawl 919 is in engagement with teeth 892 to set the angular position of the derailleur. Preferably, as shown in FIG. 11, a housing extension 830f is provided on upper pivot head 30 for housing pivot lever 914, pivot pin 915 and spring 916. In such case, it is only necessary to push the free end of pivot lever 914 that extends out of upper pivot head 30 against the force of spring 916 in order to disengage pawl 919 from teeth 892. It will be appreciated that spring end 860a is elongated so that coil spring 860 does not overlie teeth 892, and therefore, does not interfere with the engagement of teeth 892 by pawl 919. However, alternatively, spring end 860a can be made shorter in order to engage with the inner end 918a of adjuster sleeve 918.

Then, adjusting tool 952 engages with the openings 934 in annular stop ring 924 in the same manner described above with respect to mechanism 50 of FIGS. 2-5. Since end 860a is connected with adjusting tool 952, this serves to adjust the spring tension of spring 860 and thereby rotate the derailleur. Pivot lever 914 is then released, whereupon spring 916 again biases pawl 919 into engagement with teeth 892 to set the angular position of the derailleur. Because spring 860 is fixed to orienting washer 894, but rotates with adjusting tool 918 relative to upper pivot head 30, rotation of adjusting tool 918 changes the spring tension of spring 860.

In addition to, or alternative to, this arrangement, adjuster sleeve 918 can include a plurality of holes 865 which are equidistantly spaced therealong, and a hole 897 is formed in annular ring upper pivot head 30 such that one of the holes 865 is in alignment with hole 897. A pin 925 can be engaged through one of the holes 865 and through hole 897 to rotatably set the angular orientation of sleeve 918 to upper pivot head 30.

To provide adjustment, pin 925 is removed from holes 865 and 897 to permit rotation between adjuster sleeve 918 and upper pivot head 30. Then, adjusting tool 952 engages with the openings 934 in annular stop ring 924 in the same manner described above with respect to mechanism 50 of FIGS. 2-5 in order to rotate spring 860 and thereby adjust the spring tension of spring 860. Pin 925 is then reinserted through another one of the holes 865 and through hole 897 to rotatably adjust sleeve 918 with upper pivot head 30, thereby setting a different angular position of the derailleur. It will be appreciated that the angular position of holes 865 is arranged such that spring end 860a does not interfere therewith.

Figure 12:
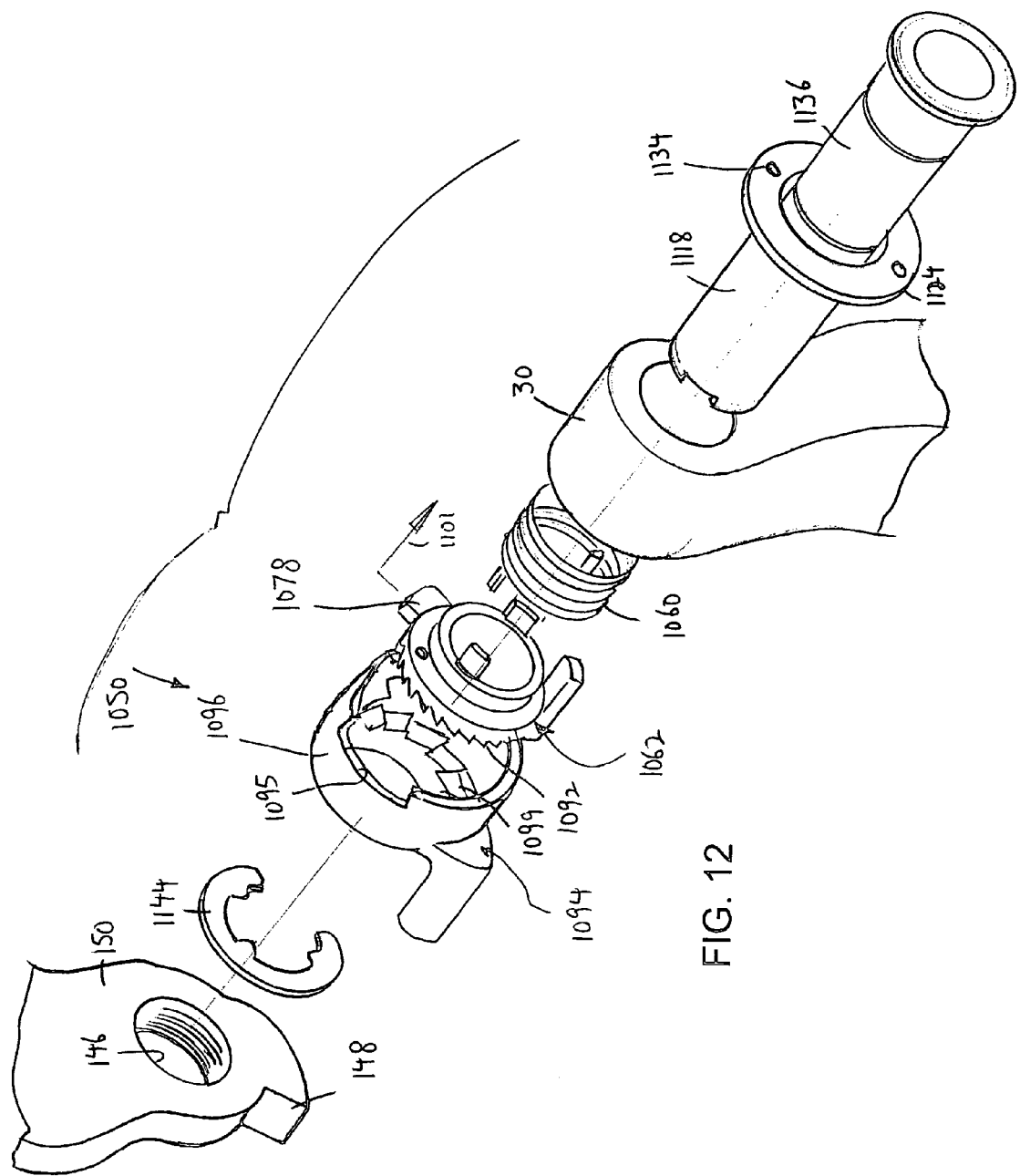
FIG. 12 is an enlarged, blown-apart view of a mechanism according to a sixth embodiment of the present invention for adjusting the angular orientation of the derailleur at the derailleur head.

Referring now to FIG. 12, a mechanism 1050 for adjusting spring tension at the derailleur head, namely, at upper pivot head 30, according to a sixth embodiment of the present invention will now be described, in which elements that are common to those in the second embodiment of FIGS. 2-5 are described by the same numerals augmented by 800, and a detailed description of the common elements will be omitted for the sake of brevity.

Specifically, mechanism 1050 includes upper pivot head 30, spring 1060, spring adjust collar 1062 with ratchet teeth 1092, orienting washer 1094, adjuster sleeve 1118, bolt 1136, lock washer 1144, rear axle holder 150 with opening 146 and ledge 148, and an adjusting tool which is identical to adjusting tool 352.

One difference is that ratchet teeth 1092 of spring adjust collar 1062 are formed in an inwardly facing manner at the periphery of spring adjust collar 1062. Also, spring adjust collar 1062 includes an upwardly extending tab 1078 that can be grasped by a user. Orienting washer 1094 is formed with a cut-away area 1095 along the outer cylindrical wall 1096 thereof for receiving tab 1078 over an angular range of between 90 degrees and 180 degrees. This permits spring adjust collar 1062 to rotate within orienting washer 1094.

Orienting washer 1094 includes corresponding outwardly facing ratchet teeth 1099 in an annular path therein for engaging with ratchet teeth 1092. Spring 1060 serves to lock ratchet teeth 1092 and 1099 together to hold the derailleur in a set angular orientation.

In order to change this angular orientation in a first direction, tab 1078 can merely be rotated in the clockwise direction of FIG. 12 in order to move ratchet teeth 1092 over ratchet teeth 1099, one at a time. Upon release of tab 1078, spring 1060 will hold ratchet teeth 1092 and 1099 in tight engagement to reset the angular orientation of the derailleur. To rotate the derailleur in the opposite direction, tab 1078 is grasped and moved in the direction of arrow 1101 in order to pull ratchet teeth 1092 away from ratchet teeth 1099, thereby compressing spring 1060. At this time, tab 1078 can be used to rotate spring adjust collar 1062 relative to orienting washer 1094, or alternatively, an adjusting tool similar to adjusting tool 352 can be used with openings 1134 in annular stop ring 1124. The latter is preferred, since there will preferably be indicia on annular stop ring 1124 to achieve the desired angular setting. Then, when the desired angular orientation is achieved, tab 1078 is released, and spring 1060 functions to bias ratchet teeth 1092 and ratchet teeth 1099 together to set this angular orientation. Alternatively, a separate spring can be used for this latter biasing arrangement, rather than spring 1060.

Figure 13:
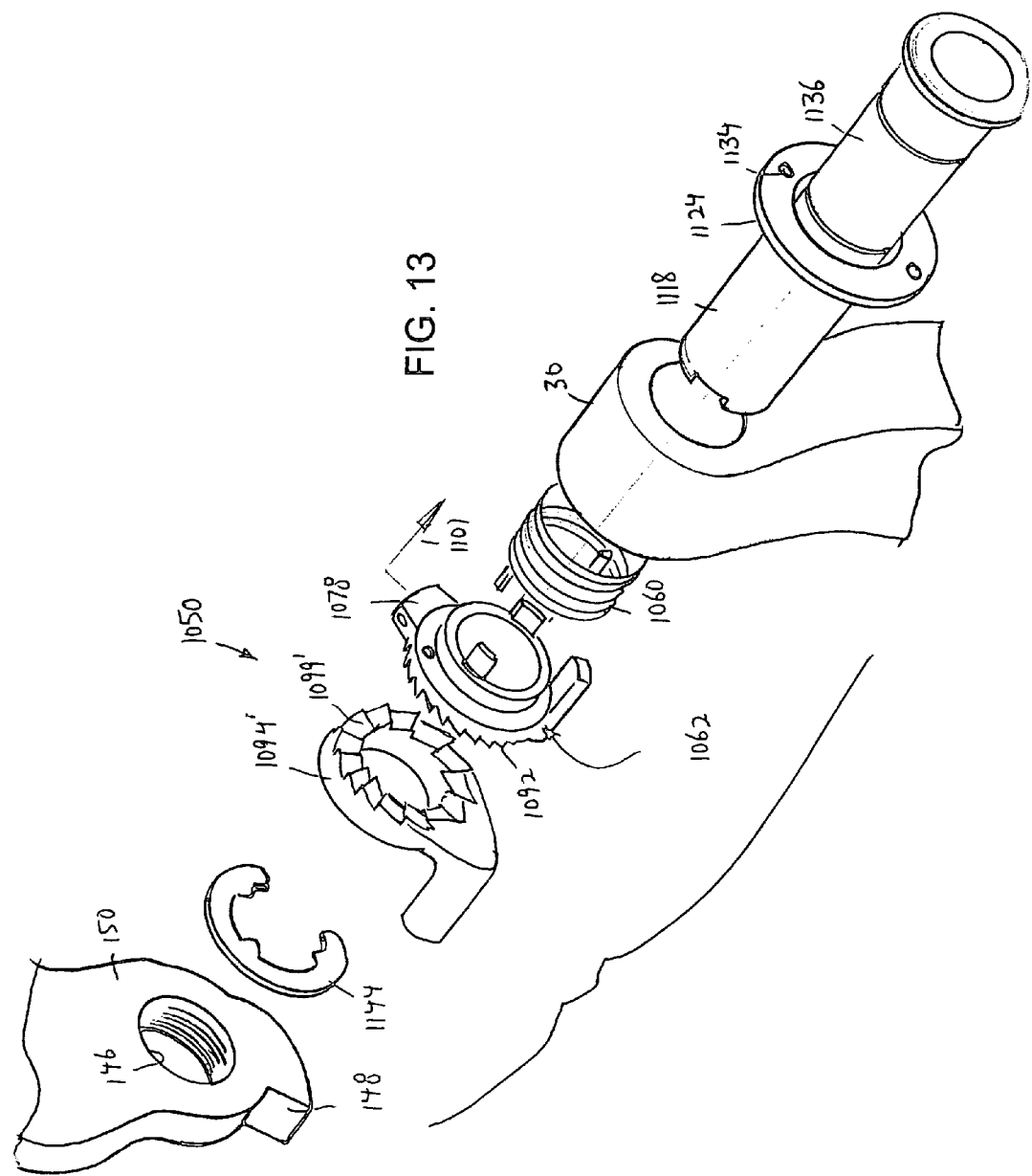
FIG. 13 is an enlarged, blown-apart view of a mechanism according to a modification of the sixth embodiment of the present invention for adjusting the angular orientation of the derailleur at the derailleur head.

As an alternative, as shown in FIG. 13, in which like parts are identified by the same reference numerals, orienting washer 1094' can be provided with ratchet teeth 1099' at the outer facing surface thereof, thereby eliminating the need for recess 1095.

Figure 14:
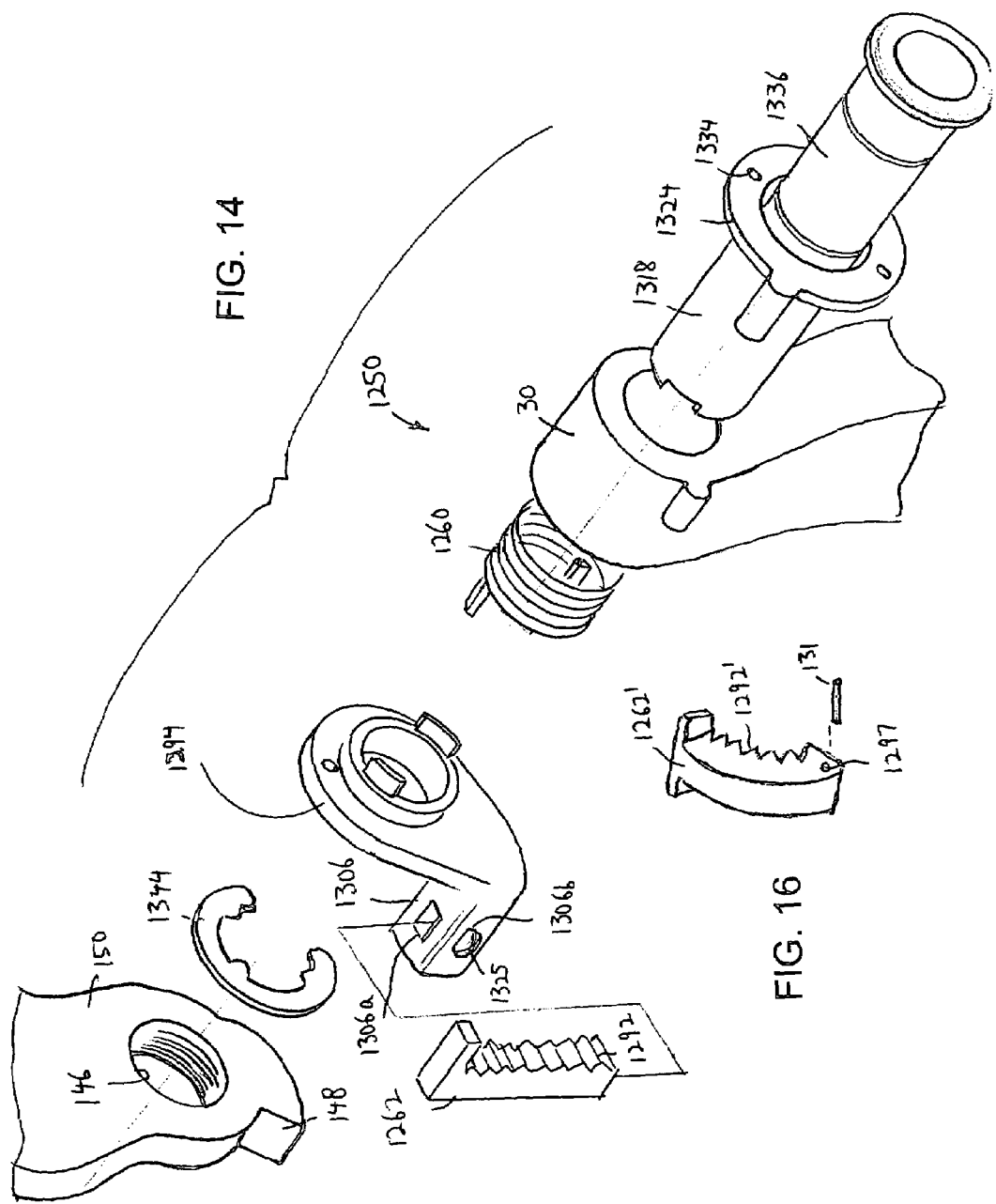
FIG. 14 is an enlarged, blown-apart view of a mechanism according to a seventh embodiment of the present invention for adjusting the angular orientation of the derailleur at the derailleur head.
Figure 15:
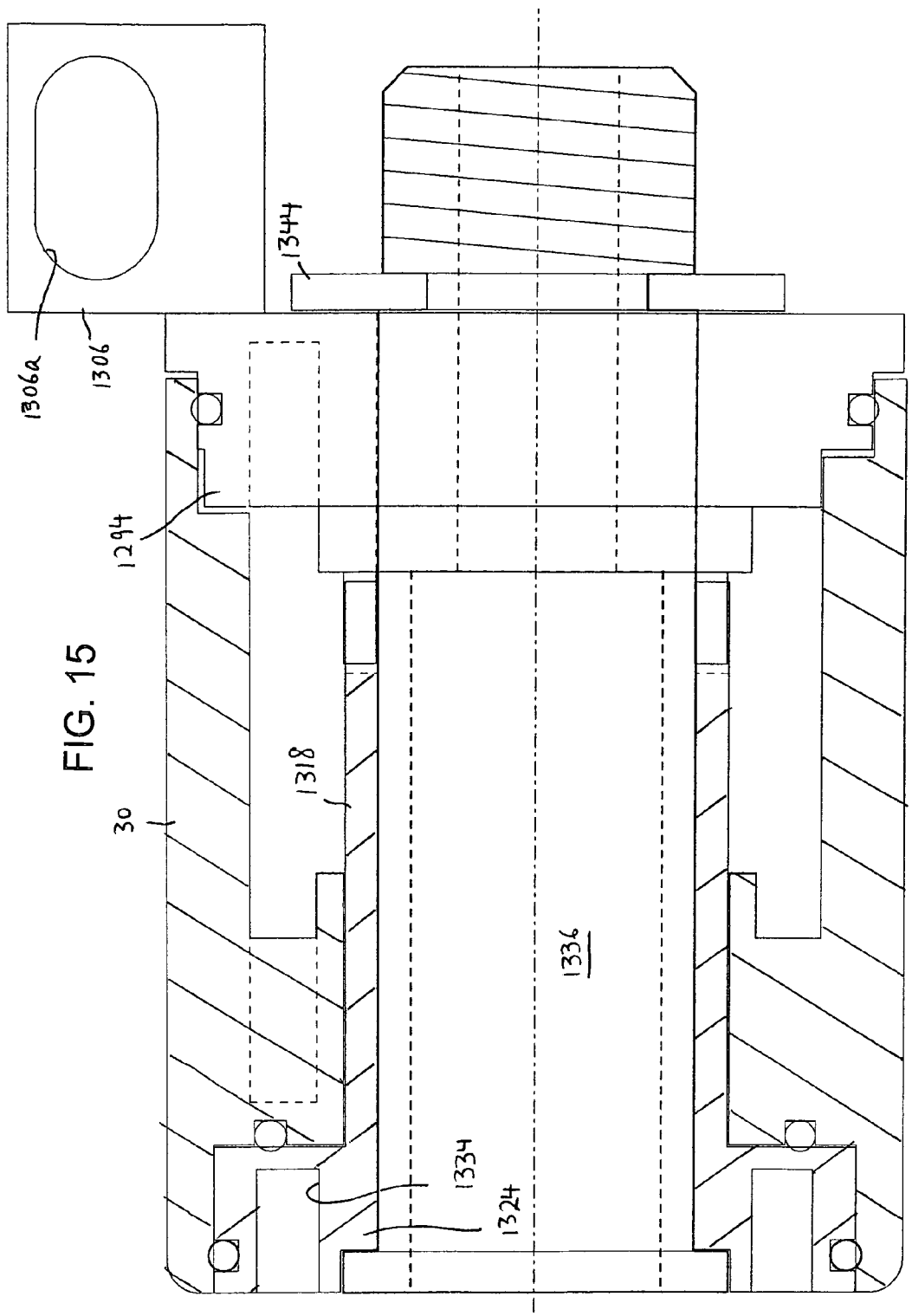
FIG. 15 is a lengthwise view, partly in cross-section, of the mechanism of FIG. 14, as assembled, without the spring and rack.

Referring now to FIGS. 14 and 15, a mechanism 1250 for adjusting spring tension at the derailleur head, namely, at upper pivot head 30, according to a seventh embodiment of the present invention will now be described, in which elements similar to those in the first embodiment of FIGS. 2-5 are described by the same numerals but augmented by 1000, and a detailed description of the common elements will be omitted for the sake of brevity.

Specifically, mechanism 1250 includes upper pivot head 30, spring 1260, orienting washer 1294, adjuster sleeve 1318, bolt 1336, lock washer 1344, rear axle holder 150 with opening 146 and ledge 148, and an adjusting tool which is the same as adjusting tool 352.

The major difference is the manner in which the derailleur is set in the desired angular orientation. In the first place, the spring adjust collar is eliminated. A bore 1306a is provided in tail 1306 of orienting washer 1294. A rack 1262 having gear teeth 1292 thereon is inserted within bore 1306a for vertically slidable movement therein. Rack 1262 is shown rotated 90 degrees offset from its actual position in tail 1306 in order to better illustrate the same. The lower end of rack 1262 normally contacts ledge 148 in the assembled condition. Tail 1306 further includes a side bore 1306b, and a spring loaded pawl 1325 is provided in side bore 1306b so that pawl 1325 is normally biased into engagement with gear teeth 1292 to retain the derailleur in the set angular orientation.

To provide adjustment, the upper end of rack 1262 is held down by a person's finger so that the lower end of rack 1262 remains in contact with ledge 148. Then, the adjusting tool engages with the openings 1334 in annular stop ring 1324 in the same manner described above with respect to mechanism 50 of FIGS. 2-5 in order to rotate the derailleur and thereby adjust the spring tension of spring 1260. During such operation, with rack 1262 held stationary, orienting washer 1294 will be rotated by sleeve 1318, whereupon pawl 1325 will release from one tooth 1292 in rack 1262 and engage in another tooth, in either direction. This continues until the correct angular orientation of the derailleur is achieved, with pawl 1325 being biased into engagement with another tooth 1292 of rack 1262 to set a different angular position of the derailleur. When the tool is released, spring 1260 exerts a biasing force on orienting washer 1294 in the counter-clockwise direction of FIG. 14 to maintain the lower end of rack 1262 in contact with ledge 148, which limits the rotation thereof. Accordingly, depending upon the location of rack 1262 in bore 1306a, the angular orientation of the derailleur will change.

A modification of the seventh embodiment is shown in FIG. 15 in which rack 1262 is replaced with rack 1262' having gear teeth 1292'. Rack 1262' is curved to better follow the adjustment path, as compared with the linear rack 1262 of FIG. 13. In addition, rack 1262' includes an opening 1297, and a pin 1317 can be inserted through an opening (not shown) in tail 1306 to engage within opening 1297 to lock rack 1262' in position, in place of, or in addition to, spring loaded pin 1325.

Figure 17:
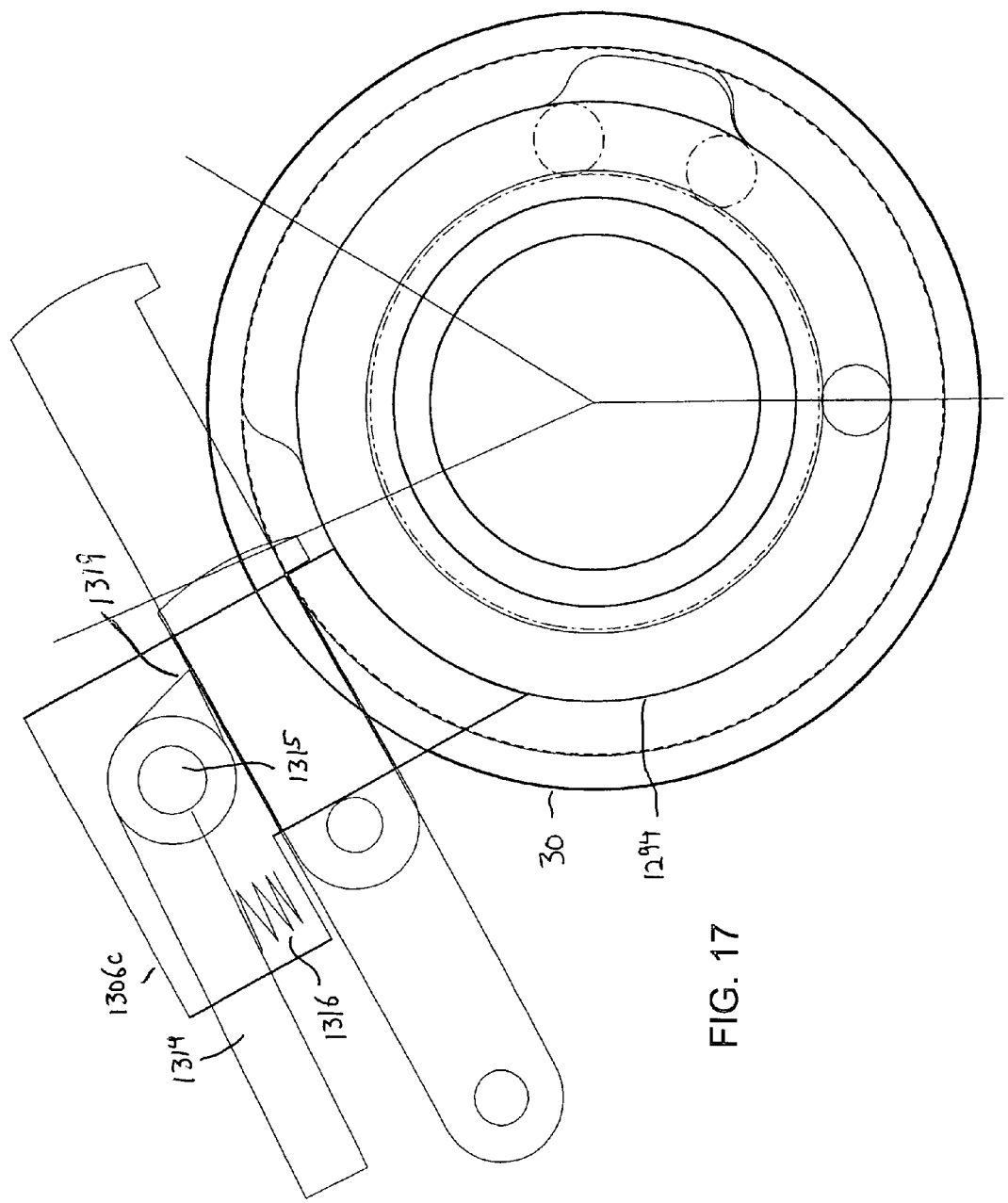
FIG. 17 is an enlarged end view of a modification of the seventh embodiment of the present invention.

As another modification of the seventh embodiment, reference is made to FIG. 17 in which spring loaded pin 1325 is replaced with a pivot lever 1314 pivotally mounted in opening 1306a by a pivot pin 1315. Pivot lever 1314 has a pawl 1319 at one end for engagement with gear teeth 1292, and a spring 1316 normally biases pivot lever 1314 so that pawl 1319 is in engagement with teeth 1292 to set the angular position of the derailleur. Preferably, a housing extension 1306c is provided on tail 1306 for housing pivot lever 1314, pivot pin 1315 and spring 1316. In such case, it is only necessary to push the free end of pivot lever 1314 that extends out of housing extension 1306c against the force of spring 1316 in order to disengage pawl 1319 from teeth 1292. Then, the adjusting tool engages with the openings 1334 in annular stop ring 1324 in the same manner described above with respect to mechanism 50 of FIGS. 2-5 in order to rotate the derailleur and thereby adjust the spring tension of spring 1260. Pivot lever 1314 is then released, whereupon spring 1316 again biases pawl 1319 into engagement with teeth 1292 to set the angular position of the derailleur.

Figure 18:
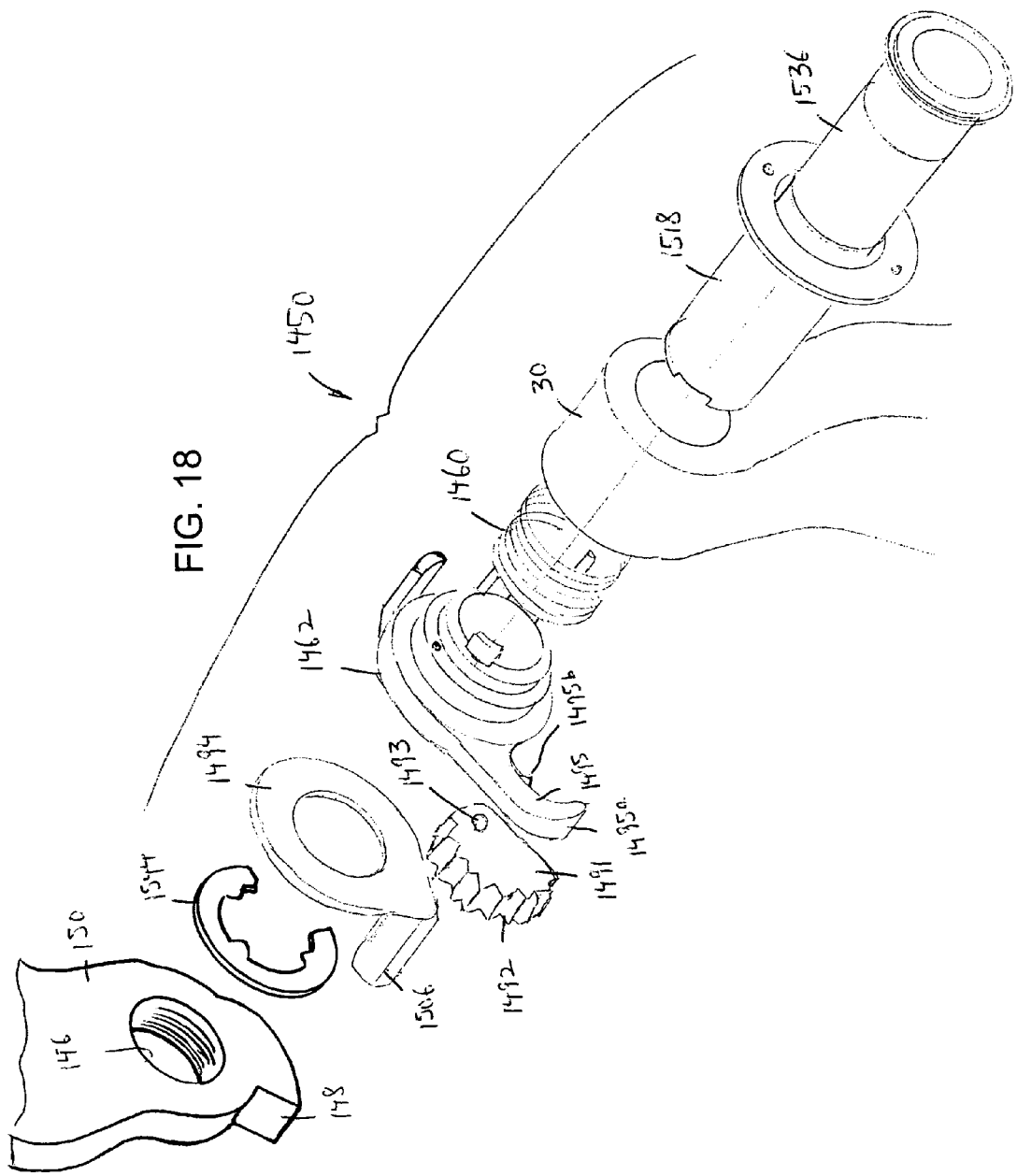
FIG. 18 is an enlarged, blown-apart view of a mechanism according to an eighth embodiment of the present invention for adjusting the angular orientation of the derailleur at the derailleur head.

Referring now to FIG. 18, a mechanism 1450 for adjusting spring tension at the derailleur head, namely, at upper pivot head 30, according to an eighth embodiment of the present invention will now be described, in which elements similar to those in the embodiment of FIG. 9 are described by the same numerals but augmented by 800, and a detailed description of the common elements will be omitted for the sake of brevity.

Specifically, mechanism 1450 includes upper pivot head 30, spring 1460, spring adjust collar 1462, orienting washer 1494, adjuster sleeve 1518, bolt 1536, lock washer 1544, rear axle holder 150 with opening 146 and ledge 148, and an adjusting tool which is the same as adjusting tool 352.

A cam 1491 is rotatably mounted in an eccentric manner about a pivot pin 1493 in an opening 1497 in the outer facing surface of orienting washer 1494 and includes a plurality of gear teeth 1492 around the outer periphery thereof. Spring adjust collar 1462 includes an extension arm 1495 which extends substantially radially out therefrom and overlies cam 1491. The outer end 1495a of extension arm is bent down to effectively encase a portion of cam 1491. The undersurface of extension arm 1495 includes a single gear tooth 1495b which meshes with gear teeth 1492. Alternatively, the locations of gear teeth 1492 and 1495b can be interchanged.

To provide adjustment, the user merely lifts up extension arm 1495 against the force of coil spring 1460 and then rotates cam 1491 in either direction. Extension arm 1495 is then released. Because of the eccentric mounting of cam 1491, a different height of cam 1491 will be in engagement with extension arm 1495, thereby tensioning spring 1460 to a greater or lesser amount. Then, spring 1460 will rotate spring adjust collar 1462 to cause extension arm 1495 to push down on the engaged cam 1491 and thereby rotate orienting washer 1494 until tail 1506 thereof hits against ledge 148. In such case, adjusting sleeve 1518 can be eliminated.

Alternatively, adjusting sleeve 1518 can be rotated by the adjusting tool to rotate spring adjust collar 1462 in the clockwise direction FIG. 18, thereby freeing gear tooth 1495b from gear teeth 1492. Then, cam 1491 is rotated by the user to the desired position, and the adjusting tool is removed, whereby spring 1460 once again biases tooth 1495b into engagement with gear teeth 1492.

Figure 19:
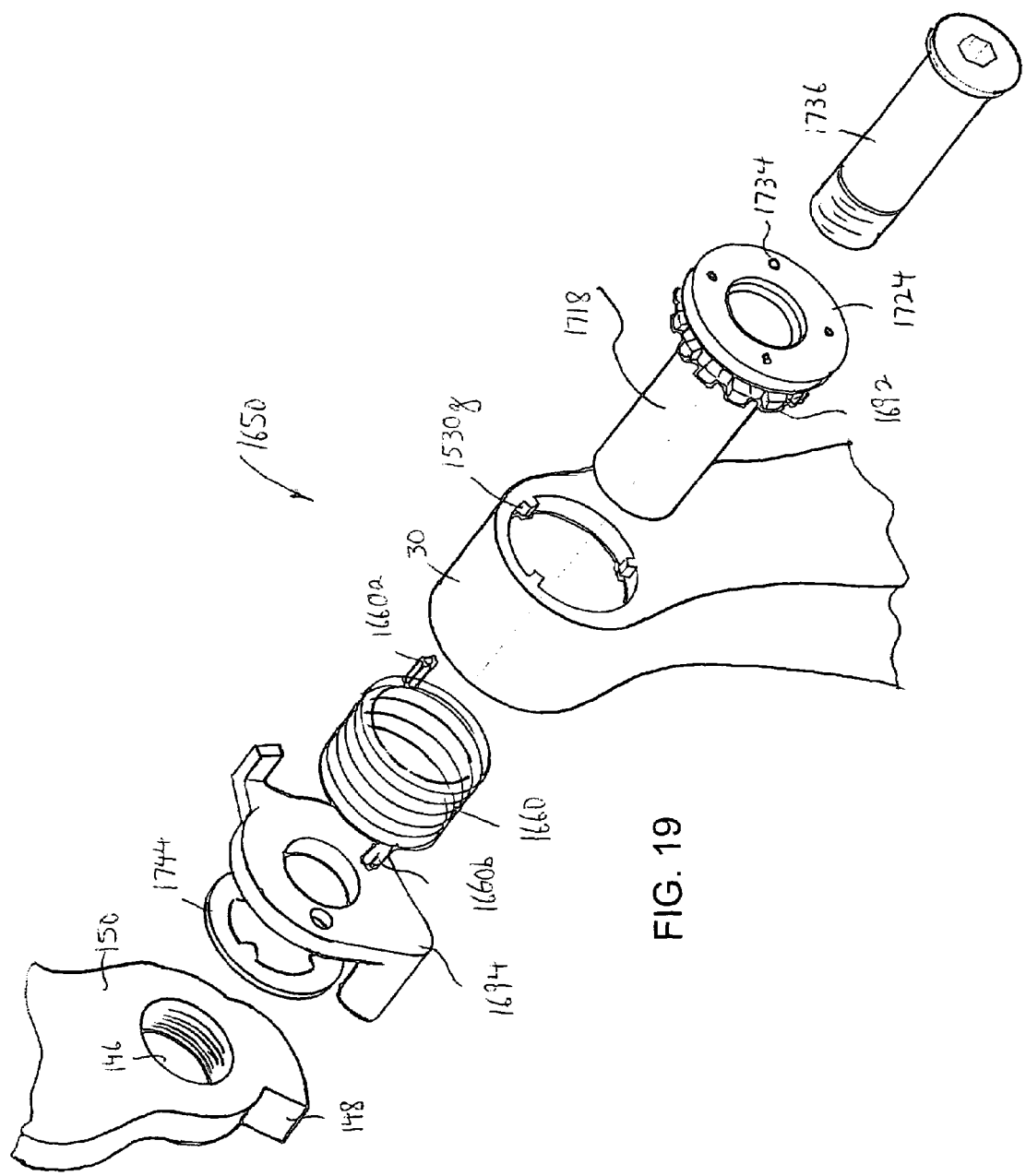
FIG. 19 is an enlarged, blown-apart view of a mechanism according to a ninth embodiment of the present invention for adjusting the angular orientation of the derailleur at the derailleur head.

Referring now to FIG. 19, a mechanism 1650 for adjusting spring tension at the derailleur head, namely, at upper pivot head 30, according to a ninth embodiment of the present invention will now be described, in which elements similar to those in the embodiment of FIGS. 10 and 11 are described by the same numerals but augmented by 800, and a detailed description of the common elements will be omitted for the sake of brevity.

Specifically, mechanism 1650 includes upper pivot head 30, spring 1660, orienting washer 1694, adjuster sleeve 1718, bolt 1736, lock washer 1744, rear axle holder 150 with opening 146 and ledge 148, and an adjusting tool which is the same as adjusting tool 952. The spring adjust collar is eliminated.

However, rather than the gear teeth extending axially along adjuster sleeve 1718, gear teeth 1692 are provided circumferentially around the main body of adjuster sleeve 1718 just inwardly of annular stop ring 1724.

Alternatively, gear teeth 1692 can be provided on the outer circumference of annular stop ring 1724. Further, at least one gear tooth, and preferably three gear teeth 1530g, are equiangularly spaced around the inner circumference of first bore 52a of first head portion 30a for engagement with gear teeth 1692. One end 1660a of spring 1660 is connected with adjusting tool 1718 and the opposite end 1660b of spring 1660 is connected with orienting washer 1694.

In order to provide an adjustment operation, the pins of the adjusting tool are inserted into openings 1734 of annular stop ring 1724, and annular stop ring 1724 and adjuster sleeve 1718 are pushed inwardly against the force of coil spring 1660. As a result, teeth 1692 disengage from teeth 1530g, and adjuster sleeve 1718 is rotated. When released, coil spring 1660 biases adjuster sleeve 1718 outwardly, whereby teeth 1692 and 1530g are again engaged with each other, but at a different angle of adjuster sleeve 1718. Since adjuster sleeve 1718 is non-rotatably connected with upper pivot head 30 and is also connected with end 1660a of spring 1660, this functions to change the spring tension of spring 1660 and thereby the angular orientation of upper pivot head 30 and the derailleur.

It will be appreciated that while the above embodiments have used adjusting tools 152, 352, etc. at the outboard side of the derailleur for ease of adjustment, the present invention is not limited thereby. For example, as shown in FIG. 9, rather than using the adjusting tool in the embodiment of FIG. 9, after the free end of pivot lever 714 is pushed down to pivot the pivot lever 714 around pivot pin 715 against the force of spring 716 in order to disengage pawl teeth 719 from teeth 692, an adjusting rod 681 is inserted into a hole 662a of spring adjust collar 662 to angularly move spring adjust collar 662. This functions to rotate the derailleur and thereby adjust the spring tension of spring 660. Pivot lever 714 is then released, whereupon spring 716 again biases pawl teeth 719 into engagement with teeth 692 to set the angular position of the derailleur. Further, a rod (not shown) can be inserted into a hole 714a in pivot lever 714 to bias pivot lever 714 against the force of spring 716.

As another alternative to using the aforementioned adjusting tool, an adjusting wrench 467, as shown in FIG. 8, can be used for rotating spring adjust collar 462. In such case, the outer circumferential surface of spring adjust collar 462 is preferably provided with spaced apart transverse grooves 462b, and wrench 467 is preferably provided with projections 467a matching grooves 462b in size and spacing in order to engage therewith during a turning operation.

It will be appreciated that, although adjusting rod 681 and wrench 467 have been described only in relation to FIGS. 9 and 8, respectively, they can likewise be used with the other embodiments as well.

In addition, the present invention considers reversal of parts to be part of the present invention. For example, pins 152c can be provided on sleeve 118, while openings 134 can be provided on tool 152.

Further, while the present invention has been discussed in relation to the derailleur head, adjustment with any of the embodiments of the present invention can be made at the derailleur cage instead. As an example, the embodiment of FIGS. 2-5 will now be described in relation to adjustment at the derailleur cage.

Figure 20:
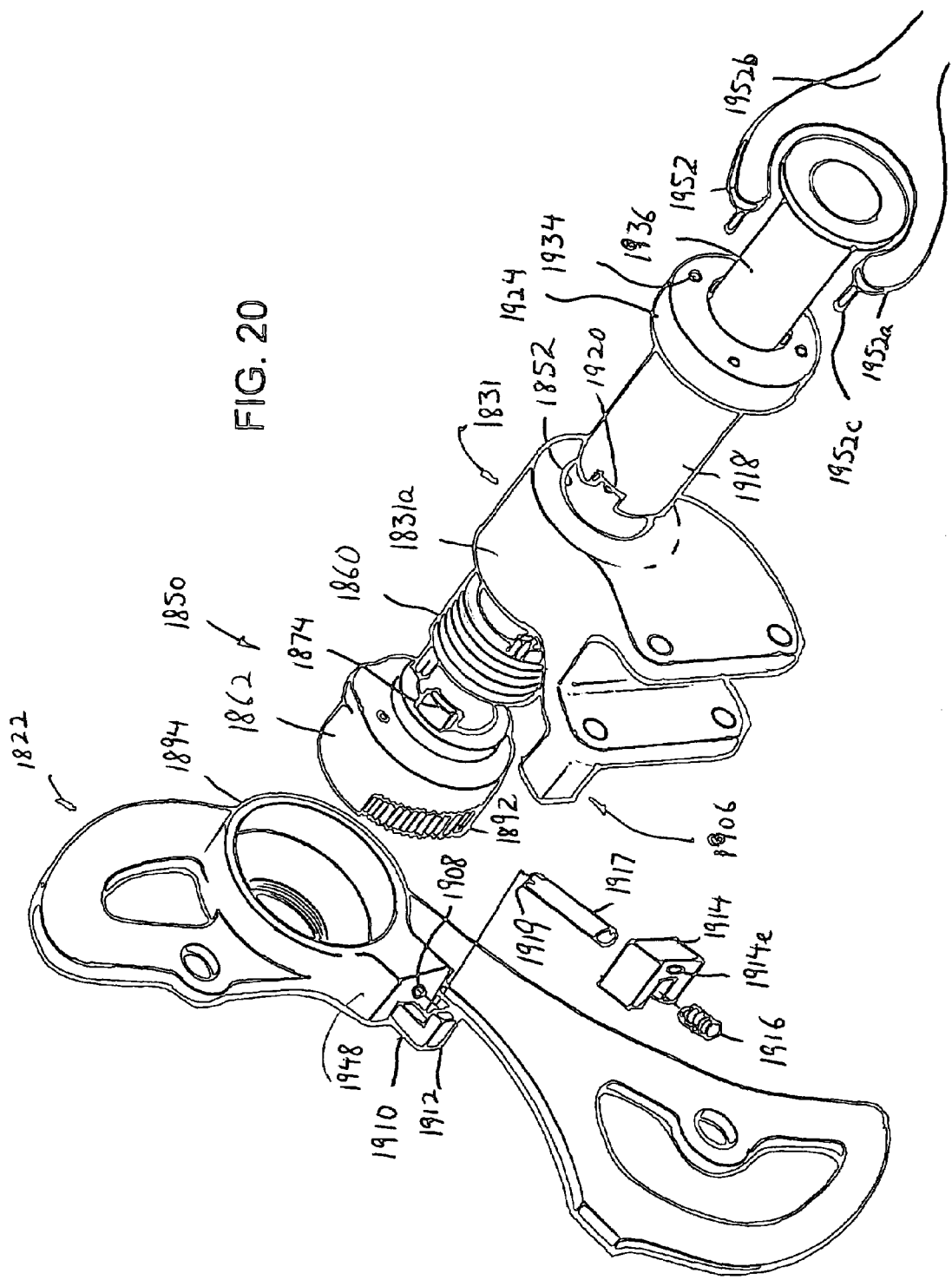
FIG. 20 is an enlarged, blown-apart view, similar to FIG. 2, of a mechanism according to a tenth embodiment of the present invention for adjusting the angular orientation of the derailleur at the lower derailleur head mounted to the chain cage.

Referring now to FIG. 20, a mechanism 1850 for adjusting spring tension at the derailleur cage, namely, at a modified outer cage plate 1822, according to a tenth embodiment of the present invention, which uses an internal ratchet or pawl, will now be described, in which like elements are described by the same numerals as those in FIGS. 2-5, augmented by 1800, and a detailed description of the common elements will be omitted for the sake of brevity.

Specifically, mechanism 1850 includes an outer cage plate 1822 of a chain cage, spring 1860, spring adjust collar 1862 with teeth 1892, orienting washer 1894 formed integrally with outer cage plate 1822, adjuster sleeve 1918, through bore 1908, L-shaped hook 1910, spring retaining leg 1912, U-shaped block 1914 with through bore 1914e, coil spring 1916, pin 1917 with pawl teeth 1919, adjuster sleeve 1918, bolt 1936 and lock washer (not shown), and adjusting tool 1952, which are essentially the same as their counterpart elements in the first embodiment of FIGS. 2-5.

In this embodiment, lower pivot head or derailleur front knuckle 1831 is also modified to provide a head 1831a with a bore 1852 which is the same as bore 52 of FIGS. 2-5. In addition, tail 1906 is provided as an inward extension on front knuckle 1831 and functions as a stop which abuts against a stop limit 1948 formed on integrally formed orienting washer 1894. In other words, tail 1906 and stop limit 1948 function in the same manner as tail 106 and ledge 148 in FIGS. 2-5.

In operation, with pawl teeth 1919 of pin 1917 in engagement with teeth 1892 of spring adjust collar 1862, the angular position of spring adjust collar 1862 is set. Spring adjust collar 1862 is rotatably fixed with sleeve 1918 through tabs 1874 and recesses 1920. Further, spring 1860 is fixed between front knuckle 1831 and spring adjust collar 1862. As a result, the tension on spring 1860 is set. Because tail 1906 abuts against stop limit 1948, spring 1860 serves to rotate the cage according to the spring tension so as to set the angular orientation of the cage.

When it is desired to change this angular orientation, it is necessary to move pawl teeth 1919 to different gear teeth 1892. In such case, an adjusting tool 1952 is provided, and has a U-shaped head 1952a and a handle 1952b secured thereto. Only a portion of handle 1952b is shown in FIG. 20. Two pins 1952c extend axially out from the inner surface of U-shaped head 1952a at the ends thereof. Specifically, pins 1952c are inserted into openings 1934 of annular stop ring 1924 in order to rotate sleeve 1918 through annular stop ring 1924. Since sleeve 1918 is rotatably fixed with spring adjust collar 1862 through tabs 1874 and recesses 1920, spring adjust collar 1862 is also caused to rotate. At this time, pin 1917 is pulled out against the force of spring 1916 to release pawl teeth 1919 from gear teeth 1892. This permits free angular adjustment of spring adjust collar 1862. When the angular adjustment is made, pin 1917 is released, so that pawl teeth 1919 again lock with gear teeth 1892. At this time, the cage is released by the person, and the tension on spring 1860 will adjust the cage to a new angular orientation according to the spring tension. Alternatively, pawl teeth 1919 can be constructed so that turning of sleeve 1918 causes pawl teeth 1919 to ride over the rotating gear teeth 1892, that is, the force of rotation of sleeve 1918 is sufficient to overcome the force of spring 1916, until the correct angular orientation is achieved and the external force is removed. In such case, pawl teeth 1919 will again lock with gear teeth 1892.

It will therefore be appreciated that, with the tenth embodiment, adjustment of the spring tension of spring 1860, and thereby, the angular orientation of the cage, can be achieved at an outboard position by adjuster sleeve 1918.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A mechanism for adjusting spring tension at a derailleur head, comprising:
   a rotatable orienting washer;
   a coil spring having a first end fixed relative to the derailleur head and having a second, opposite end rotatably mounted relative to the orienting washer;
   an adjusting device for rotating said second end of the coil spring relative to the derailleur head, without contacting said orienting washer, to adjust tension of said coil spring, said adjusting device including:
   an adjusting sleeve adapted to rotatably extend through the derailleur head and parallel to and at least substantially along the entire length of the coil spring, and connected one of directly and indirectly with the second end of the spring, and an adjusting tool for engaging said adjusting sleeve to rotate said adjusting sleeve in said derailleur head;

a retaining arrangement for releasably retaining said second end of said coil spring at a desired angular position after said second end of the coil spring has been rotated, said retaining arrangement including:

a spring adjust collar rotatably mounted relative to said orienting washer, and said second end of said coil spring is fixed to said spring adjust collar, gear teeth on said spring adjust collar, and a holding device for engaging with said gear teeth to retain said spring adjust collar and said second end of said coil spring at a desired angular position after said spring adjust collar has been rotated; and a securing and mounting arrangement for securing together said orienting washer, said coil spring, said adjusting device and said retaining arrangement to assemble said mechanism and for mounting said assembled mechanism to the derailleur head and one of a bicycle frame and a derailleur cage.

2. A mechanism according to claim 1, wherein said adjusting device is non-rotatably connected with said spring adjust collar and said spring adjust collar is rotatable relative to said derailleur head in order to adjust the tension of said coil spring.

3. A mechanism according to claim 2, wherein said holding device includes:

a lever pivotally mounted to said orienting washer and including a pawl at an end thereof, and a spring which biases said lever to move said pawl into releasable locking engagement with said gear teeth.

4. A mechanism according to claim 2, wherein said gear teeth includes a first set of ratchet teeth on said spring adjust collar, and said holding device includes a second set of ratchet teeth on said orienting washer, such that said coil spring biases said first and second sets of ratchet teeth into mating engagement.

5. A mechanism according to claim 4, wherein said spring adjust collar includes a tab for moving apart said first and second sets of ratchet teeth against the force of said coil spring.

6. A mechanism according to claim 1, wherein:

said adjusting sleeve engages said spring adjust collar such that said coil spring has its tension changed when said adjusting tool rotates said adjusting sleeve.

7. A mechanism according to claim 6, wherein said adjusting tool includes one of the following for rotating said spring adjust collar:

a rod, and a wrench.

8. A mechanism according to claim 1, wherein said holding device includes a pin extending through said orienting washer and having a pawl at an end thereof.

9. A mechanism according to claim 1, wherein:

said adjusting sleeve includes a plurality of openings, and said adjusting tool includes a plurality of pins for engaging within said openings to rotate said sleeve.

10. A mechanism according to claim 1, wherein said derailleur head is mountable to a bicycle frame having a limiting stop, said orienting washer is adapted to be rotatably mounted relative to the bicycle frame, the orienting washer has a tail for always engaging the limiting stop of the bicycle frame, and said securing and mounting arrangement secures together said orienting washer, said coil spring, said adjusting device and said retaining arrangement for mounting said assembled mechanism to the bicycle frame and the derailleur head.

11. A mechanism according to claim 1, wherein said derailleur head is rotatably mountable to a derailleur cage and includes a tail, said orienting washer is fixed to said derailleur cage and includes a limiting stop which is engaged by said tail, and said securing and mounting arrangement secures together said orienting washer, said coil spring, said adjusting device and said retaining arrangement and for mounting said assembled mechanism to the bicycle frame and the derailleur cage.

12. A mechanism according to claim 1, wherein said adjusting sleeve is adapted to rotatably extend through the coil spring at least substantially along the entire length of the coil spring.

* * * * *